(12) United States Patent
Taki et al.

(10) Patent No.: US 11,030,979 B2
(45) Date of Patent: Jun. 8, 2021

(54) INFORMATION PROCESSING APPARATUS AND INFORMATION PROCESSING METHOD

(71) Applicant: SONY CORPORATION, Tokyo (JP)

(72) Inventors: Yuhei Taki, Kanagawa (JP); Shinichi Kawano, Tokyo (JP); Hiro Iwase, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/485,600

(22) PCT Filed: Oct. 30, 2018

(86) PCT No.: PCT/JP2018/040274
§ 371 (c)(1),
(2) Date: Aug. 13, 2019

(87) PCT Pub. No.: WO2019/138661
PCT Pub. Date: Jul. 18, 2019

(65) Prior Publication Data
US 2019/0371280 A1    Dec. 5, 2019

(30) Foreign Application Priority Data
Jan. 12, 2018  (JP) .............................. JP2018-003403

(51) Int. Cl.
*G09G 5/38*    (2006.01)
*H04L 12/58*   (2006.01)
*G09G 3/00*    (2006.01)

(52) U.S. Cl.
CPC ............... *G09G 5/38* (2013.01); *H04L 51/24* (2013.01); *G09G 3/002* (2013.01); *G09G 2356/00* (2013.01); *H04L 51/20* (2013.01)

(58) Field of Classification Search
None
See application file for complete search history.

(56) References Cited

U.S. PATENT DOCUMENTS

| | | | | |
|---|---|---|---|---|
| 2012/0088520 A1* | 4/2012 | Harada | ............... | G01C 21/20 455/456.1 |
| 2015/0193098 A1* | 7/2015 | Kauffmann | ........... | G06F 3/0484 715/771 |
| 2016/0021047 A1* | 1/2016 | Sawato | ................... | H04W 4/12 455/456.3 |
| 2016/0034042 A1* | 2/2016 | Joo | ...................... | G02B 27/017 345/633 |
| 2016/0366269 A1* | 12/2016 | Mansour | ........... | H04M 1/72448 |
| 2017/0169610 A1* | 6/2017 | King | ..................... | H04N 7/157 |
| 2017/0358141 A1* | 12/2017 | Stafford | .................. | G06F 3/011 |
| 2018/0150996 A1* | 5/2018 | Gatta | ..................... | G06F 3/013 |
| 2018/0329718 A1* | 11/2018 | Klein | ..................... | G06F 3/017 |

* cited by examiner

*Primary Examiner* — Jwalant Amin
(74) *Attorney, Agent, or Firm* — Paratus Law Group, PLLC

(57) ABSTRACT

There is provided an information processing apparatus to enable more proper control of a projection of an object notifying a user of a message on the basis of an attribute of the message. The information processing apparatus includes: an acquisition unit that acquires a message; and a control unit that controls projection of an object notifying a user of the message on the basis of an attribute of the message.

11 Claims, 15 Drawing Sheets

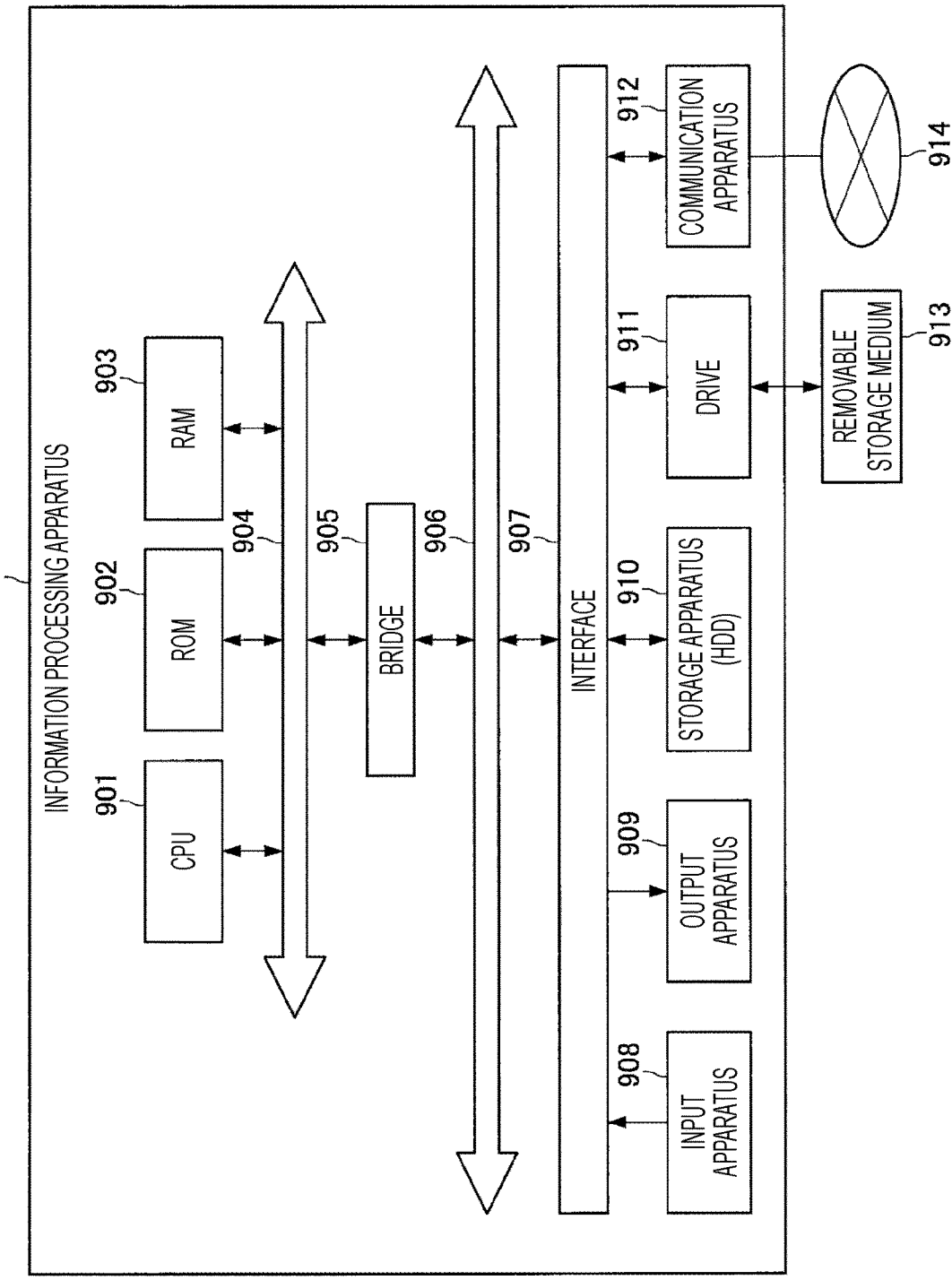

INFORMATION PROCESSING APPARATUS AND INFORMATION PROCESSING METHOD

CROSS REFERENCE TO PRIOR APPLICATION

This application is a National Stage Patent Application of PCT International Patent Application No. PCT/JP2018/040274 (filed on Oct. 30, 2018) under 35 U.S.C. § 371, which claims priority to Japanese Patent Application No. 2018-003403 (filed on Jan. 12, 2018), which are all hereby incorporated by reference in their entirety.

TECHNICAL FIELD

The present disclosure relates to an information processing apparatus and an information processing method.

BACKGROUND ART

In recent years, it has been become possible to provide a new function including internet of things (IOT) in such a way that a plurality of information processing apparatuses communicates and operates with one another.

For example, Patent Document 1 below discloses a display apparatus that has a display screen and is capable of communication, the display apparatus including an attribute management unit that manages attribute information corresponding to edge pieces obtained when an edge of a display screen is divided; an apparatus management unit that identifies different equipment that is co-operable by communication corresponding to at least one of identification information or attribute information of the edge pieces; and a display control unit that causes management of the different equipment or cooperation with the different equipment to be displayed on the display screen of the display apparatus. When the equipment is identified corresponding to the edge pieces of the display screen in the above manner, it is possible to obtain an advantageous effect that it becomes easy for the user to manage the equipment. For example, the user can easily grasp a direction in which, with reference to the display screen, the equipment which is a management target is positioned.

CITATION LIST

Patent Document

Patent Document 1: Japanese Patent Application No. 2009-289330

SUMMARY OF THE INVENTION

Problems to be Solved by the Invention

However, depending on the prior technology of Patent Document 1 or the like, it is difficult to properly control a projection of an object for which a message is notified to the user on the basis of the attribute of the message.

Thus, the present disclosure proposes a novel and improved information processing apparatus and information processing method that can more properly control a projection of an object for which a message is notified to a user on the basis of the attribute of the message.

Solutions to Problems

According to the present disclosure, there is provided an information processing apparatus including: an acquisition unit that acquires a message; and a control unit that controls projection of an object notifying a user of the message on the basis of an attribute of the message.

Moreover, according to the present disclosure, there is provided an information processing method executed by a computer including: acquiring a message; and controlling projection of an object notifying a user of the message on the basis of an attribute of the message.

Effects of the Invention

As described above, according to the present disclosure, it is possible to more properly control a projection of an object for which a message is notified to the user on the basis of the attribute of the message.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 17 is a block diagram illustrating a hardware configuration example of the information processing apparatus 100 according to the present disclosure.

MODE FOR CARRYING OUT THE INVENTION

Figure 1:
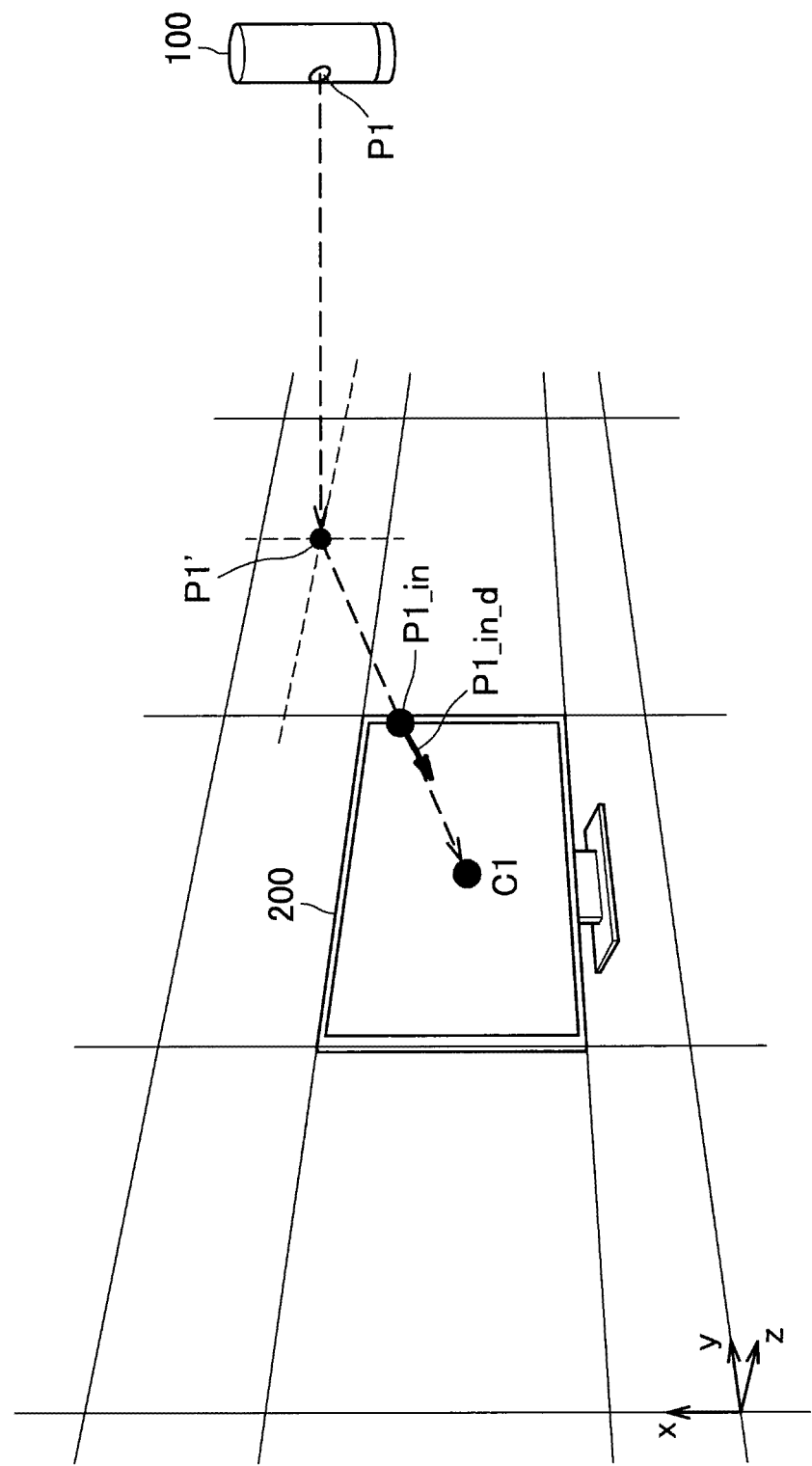
FIG. 1 is a diagram for explaining a first example according to the present disclosure.

Preferred embodiments of the present disclosure will be described in detail below with reference to the accompanying drawings. Note that, in this description and the drawings, configuration elements that have substantially the same function and configuration are denoted with the same reference numerals, and repeated explanation is omitted.

Note that the description is given in the order below.
1. BACKGROUND
2. First example
  2.1. System configuration example
  2.2. Function configuration example of information processing apparatus 100
  2.3. Processing example of information processing apparatus 100
  2.4. First modification
  2.5. Second modification
3. Second example
4. Third example
5. Hardware configuration example
6. Conclusion

1. BACKGROUND

First, the background of the present disclosure is described.

As described above, depending on the prior technology of Patent Document 1 or the like, it is difficult to properly control a projection of an object for which a message is notified to the user on the basis of the attribute of the message.

For example, there is a function to project an object to a display or the like that notifies the user of a message in a case where the information processing apparatus (e.g., an agent apparatus or smartphone) owned by the user receives the certain message. Thus, the user can recognize that the information processing apparatus has received the message.

Now, for example, in a case where the user waits for arrival of home delivery, the user wants to know a separation distance from a courier. In a case where if the courier transmits a certain message (e.g., a message related to a movement situation or the like) to the information processing apparatus owned by the user, depending on a conventional technology, the information processing apparatus cannot control (change) the projection of an object on the basis of the attribute of the message. In other words, because the object is projected uniformly, the user cannot know a separation distance from the courier from the object.

Furthermore, for example, in a case where the user is in a house and any of the plurality of information processing apparatuses in the house receives a message from an external apparatus, the user wants to know which information processing apparatus has received the message. However, depending on a conventional technology, the information processing apparatus cannot control (change) the projection of an object on the basis of the attribute of the message. Therefore, the user cannot know from the object which information processing apparatus has received the message.

Furthermore, for example, regardless of the attribute of the message or the like, when the object including the content of the message is projected uniformly, the content of the message can be conveyed even to another user who should not view.

The disclosure of the present case has arrived at creating the technology according to the present disclosure in view of the aforementioned situation. The information processing apparatus 100 according to the present disclosure can control the projection of an object that gives a notification of a message on the basis of the attribute of the message.

For example, the information processing apparatus 100, which has received a message from a courier, can change an object to be projected to an object that indicates a separation distance from the courier, or the like, on the basis of the attribute of the message. Furthermore, for example, in a case where any of the plurality of the information processing apparatuses 100 in a house has received the message from an external apparatus, the information processing apparatus 100, which has received the message, can change an object to be projected to an object that indicates a direction from the user to the information processing apparatus 100, or the like, on the basis of the attribute of the message. Therefore, the user who has recognized the object can intuitively specify the information processing apparatus 100, which has received the message, on the basis of the direction.

Furthermore, the information processing apparatus 100 can control the content of the object depending on the attribute of the message or the like. In this way, for example, in a case where another use who should not view the content of the message is present nearby, the information processing apparatus 100 can project an icon indicating the message as an object, not the content of the message, or the like.

In the following, details of examples of the present disclosure are described in sequence. In the first example, description is given of an example in which a direction from the user to a message transmission source apparatus (e.g., the information processing apparatus 100, an external apparatus, or the like) is indicated by object projection control. In the second example, description is given of an example in which a separation distance between the user and the message transmission source apparatus is indicated by object projection control. Finally, in the third example, description is given of an example in which both a direction from the user to the message transmission source apparatus and a separation distance between the user and the message transmission source apparatus are indicated by object projection control.

2. FIRST EXAMPLE

In the above description, the background of the present disclosure is described. Next, the first example according to the present disclosure is described. The first example is an example in which a direction from the user to the message transmission source apparatus is indicated by object projection control.

2.1. System Configuration Example

First, a system configuration example of the present example is described with reference to FIG. 1. As illustrated in FIG. 1, the present example includes the information processing apparatus 100 and a display apparatus 200.

The information processing apparatus 100 is an apparatus that transmits a message to the display apparatus 200, and is also an apparatus that projects any object for notifying the user of the message to the display apparatus 200. For example, the information processing apparatus 100 projects an icon indicating the message, the content of the message, or the like to the display apparatus 200 as the object. Thus, the user can recognize that the message has been transmitted from the information processing apparatus 100 to the display apparatus 200.

Furthermore, the information processing apparatus 100 can communicate with any external apparatus, and, in a case of receiving a message from the external apparatus, may project any object for notifying the user of the message to the display apparatus 200. For example, the information processing apparatus 100 when receiving the message from the external apparatus, may project an icon indicating the message, the content of the message, or the like to the display apparatus 200 as the object. Thus, the user can recognize that the message from the external apparatus has been received by the information processing apparatus 100.

Note that, as described above, the "message" includes not only those transmitted from the information processing apparatus 100 to the display apparatus 200, but also those transmitted from the external apparatus to the information processing apparatus 100.

Moreover, the information processing apparatus 100 controls the projection on the basis of the attribute of the message. Here, the attribute of the message includes various concepts. For example, examples of the attribute of the message include, but are not limited to, the type of message (or classification, category, or the like), information indicating the content of a message, information indicating software (application) used for transmitting or receiving a message, information indicating a message transmission source apparatus (e.g., information processing apparatus 100 or external apparatus), and information indicating a destination of a message (e.g., a destination user, the number of destinations, or the like).

A projection that indicates a direction from the user to the message transmission source apparatus is described more specifically. The information processing apparatus 100 recognizes coordinates in which each of points constituting an own apparatus, the display apparatus 200, and other real objects is located on an orthogonal coordinate system of a three-dimensional space. Then, as illustrated in FIG. 1, the information processing apparatus 100 calculates intersection P1' obtained when a normal line is drawn from central point P1 of the own apparatus toward a parallel surface passing through a projection surface (synonymous with the display of the display apparatus 200) onto which projection is performed. Then, the information processing apparatus 100 calculates an intersection P1_in between a straight line, which passes central point C1 of the projection surface and the intersection P1', and an end of the projection surface. Finally, the information processing apparatus 100 projects any object for notifying the user of the message near intersection P1_in (e.g., a position after moving by a predetermined distance from intersection P1' in a direction P1_in_d of intersection P1_in with reference to intersection P1_in).

For example, in a case where the information processing apparatus 100, which is a message transmission source, is positioned in an upward direction of the display apparatus 200 (e.g., in a case where the display apparatus 200 is positioned in a room on the first floor and the information processing apparatus 100 is positioned in a room on the second floor, which is immediately above the room), the object is projected near an end in an upward direction of the projection surface.

Thus, the user can intuitively recognize the direction from the display apparatus 200 to the information processing apparatus 100, which is a message transmission source apparatus. Therefore, particularly, even in a case where a plurality of apparatuses having a function similar to that of the information processing apparatus 100 is present in a limited space such as a house or a facility, the user can intuitively specify the information processing apparatus 100 that is a transmission source.

Furthermore, the information processing apparatus 100 may indicate a direction from the display apparatus 200 to the message transmission source apparatus by also using animation, sound localization technology, or the like. More specifically, in a case where the message transmission source apparatus is positioned behind the display apparatus 200 (negative in z coordinate in FIG. 1), the information processing apparatus 100 may project an animation in which object projection becomes gradually large or may change a sound image from a negative z coordinate position to a positive z coordinate position so as to express a state in which the object come closer to the user from afar. In contrast, in a case where the message transmission source apparatus is positioned in front of the display apparatus 200 (positive in z coordinate in FIG. 1), the information processing apparatus 100 may project an animation in which object projection becomes gradually small or may change a sound image from a positive z coordinate position to a negative z coordinate position so as to express a state in which the object goes away from the user from nearby. Thus, the user can intuitively recognize the front-and-rear relationship between the display apparatus 200 and the message transmission source apparatus. Furthermore, in a case where the display apparatus 200 is a thing whose direction frequently varies, line a smartphone or the like, the object projection position is unstable and therefore the projection aspect of FIG. 1 is not appropriate. Therefore, in this case, the information processing apparatus 100 controls the projection position in the manner illustrated in FIG. 1 immediately after the object is projected, but may project the object in a predetermined position after a lapse of a predetermined period of time. Thus, the instability of the object projection position is reduced.

Note that, in the above example, technically, a direction from the "display apparatus 200" to the message transmission apparatus (information processing apparatus 100) is indicated. However, because the user is positioned in a location at which it is possible to visually recognize the projection surface of the display apparatus 200, it can be said that the indication of the direction from the "display apparatus 200" to the message transmission apparatus (information processing apparatus 100) is equivalent to the indication of a direction from the "user" to the message transmission apparatus (information processing apparatus 100).

Figure 2:
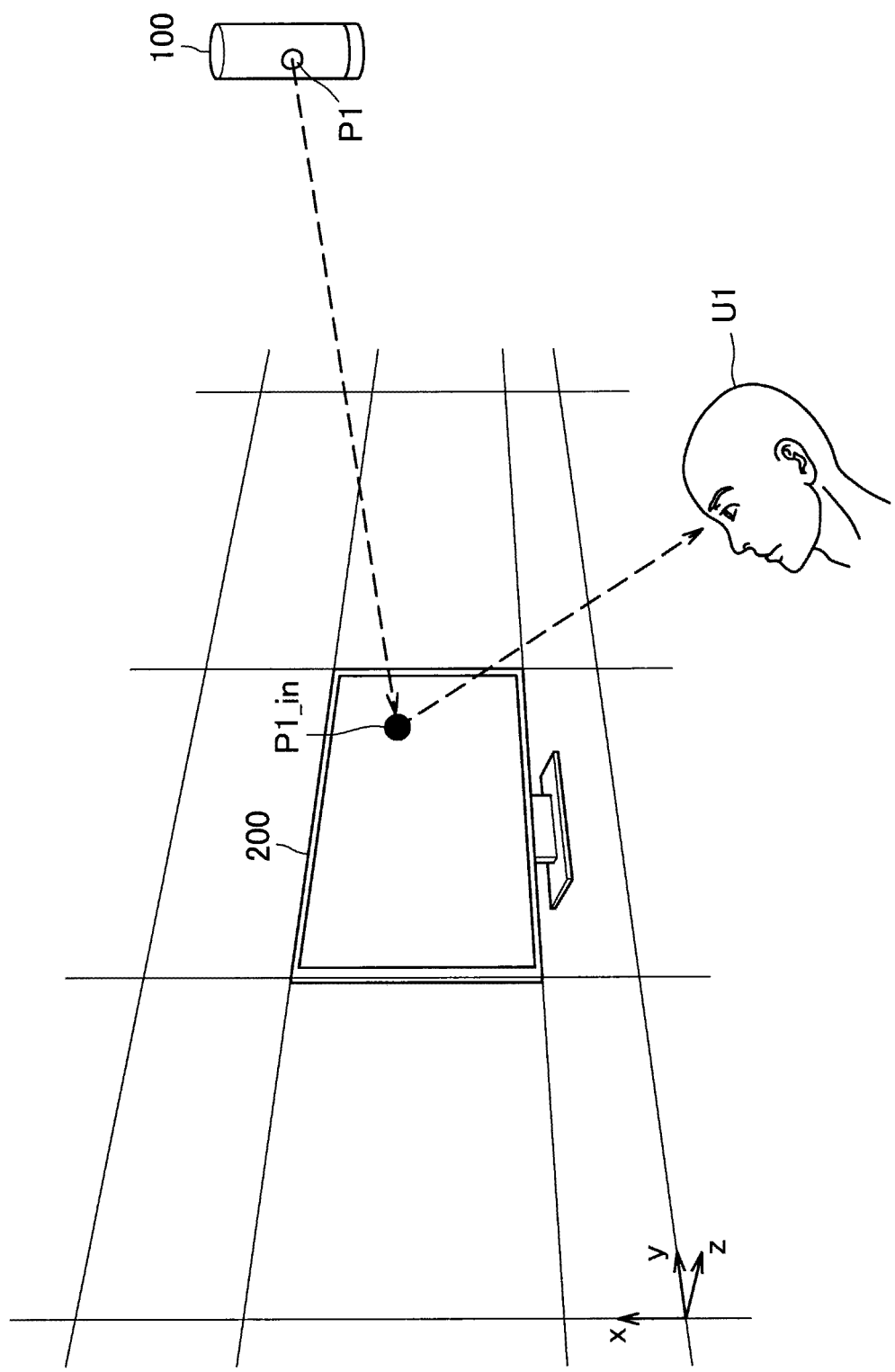
FIG. 2 is a diagram for explaining the first example according to the present disclosure.

Furthermore, the above is a mere example, and the processing aspect is not limited to the above. For example, as illustrated in FIG. 2, the information processing apparatus 100 may project any object for notifying a user U1 of the message in a vicinity of the point on the projection surface that connects the user U1 and the message transmission apparatus (information processing apparatus 100) with the substantially shortest distance.

More specifically, similar to the above, the information processing apparatus 100 recognizes coordinates in which each of points constituting an own apparatus, the display apparatus 200, and other real objects (including the user U1) is located on an orthogonal coordinate system of a three-dimensional space. Then, as illustrated in FIG. 2, the information processing apparatus 100 calculates a position of one point P1_in on the projection surface such that a path from the central point P1 of the own apparatus to an eye of the user U1 (either right eye or left eye; or the central point of the head of the user U1) via a point on the projection surface becomes substantially the shortest distance. Then, the information processing apparatus 100 may project an object in a vicinity of one point P1_in on the projection surface.

Figure 3:
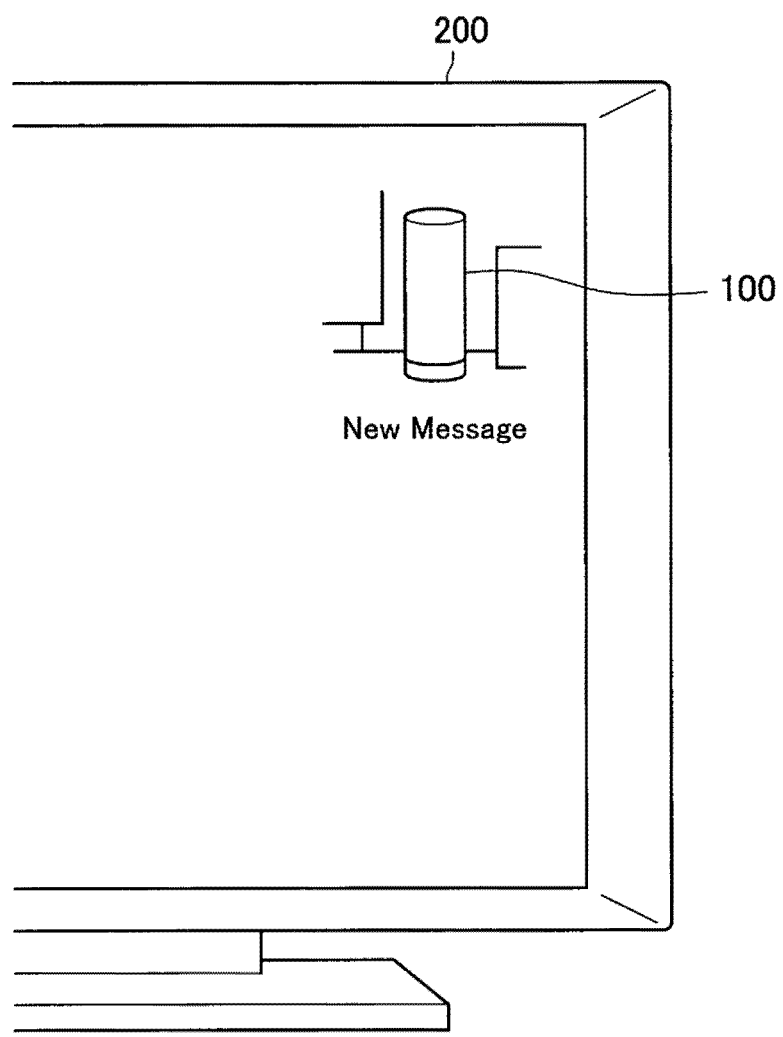
FIG. 3 is a diagram for explaining the first example according to the present disclosure.

Furthermore, in that case, the information processing apparatus 100 may not project a mere object, but, as illustrated in FIG. 3, may project an edited captured image of the information processing apparatus 100 and a surrounding real object as an object.

Thus, because it appears to the user as if the information processing apparatus 100 is specular-reflected at one point P1_in on the projection surface, the user can more intuitively recognize the direction to the information processing apparatus 100.

Note that in the example of FIGS. 2 and 3, the method of imaging a captured image of the information processing apparatus 100 and a surrounding real object is not particularly limited. For example, the method may be achieved such that the display apparatus 200 includes an imaging function or the method may be achieved such that another external apparatus includes an imaging function and a captured image generated by the external apparatus is provided to the display apparatus 200.

Furthermore, the type of the display apparatus 200 is not particularly limited. For example, the display apparatus 200 may be a television, a smartphone, personal computer (PC), a tablet PC, or the like with a display, which is a projection surface. Furthermore, the display apparatus 200 may be a projector or the like that can perform projection on the projection surface.

Furthermore, in the above, the information processing apparatus 100 controls projection of an object, but is not limited thereto. For example, a server (e.g., a cloud server) that can communicate with the information processing apparatus 100 is present, and the server may control the projection of an object. In this case, the server recognizes coordinates in which each of points constituting the information processing apparatus 100, the display apparatus 200, and other real objects is located on an orthogonal coordinate system of a three-dimensional space. Then, for example, in a case where the information processing apparatus 100 has received a message from the external apparatus, the information processing apparatus 100 cooperates with the server to that effect. Then, the server calculates point P1_in by the method similar to the above, and projects any object for notifying the user of the message in the vicinity of point the P1_in.

2.2. Function Configuration Example of Information Processing Apparatus 100

In the above, a system configuration example of the present example is described. Next, a functional configuration example of the information processing apparatus 100 is described with reference to FIG. 4.

Figure 4:
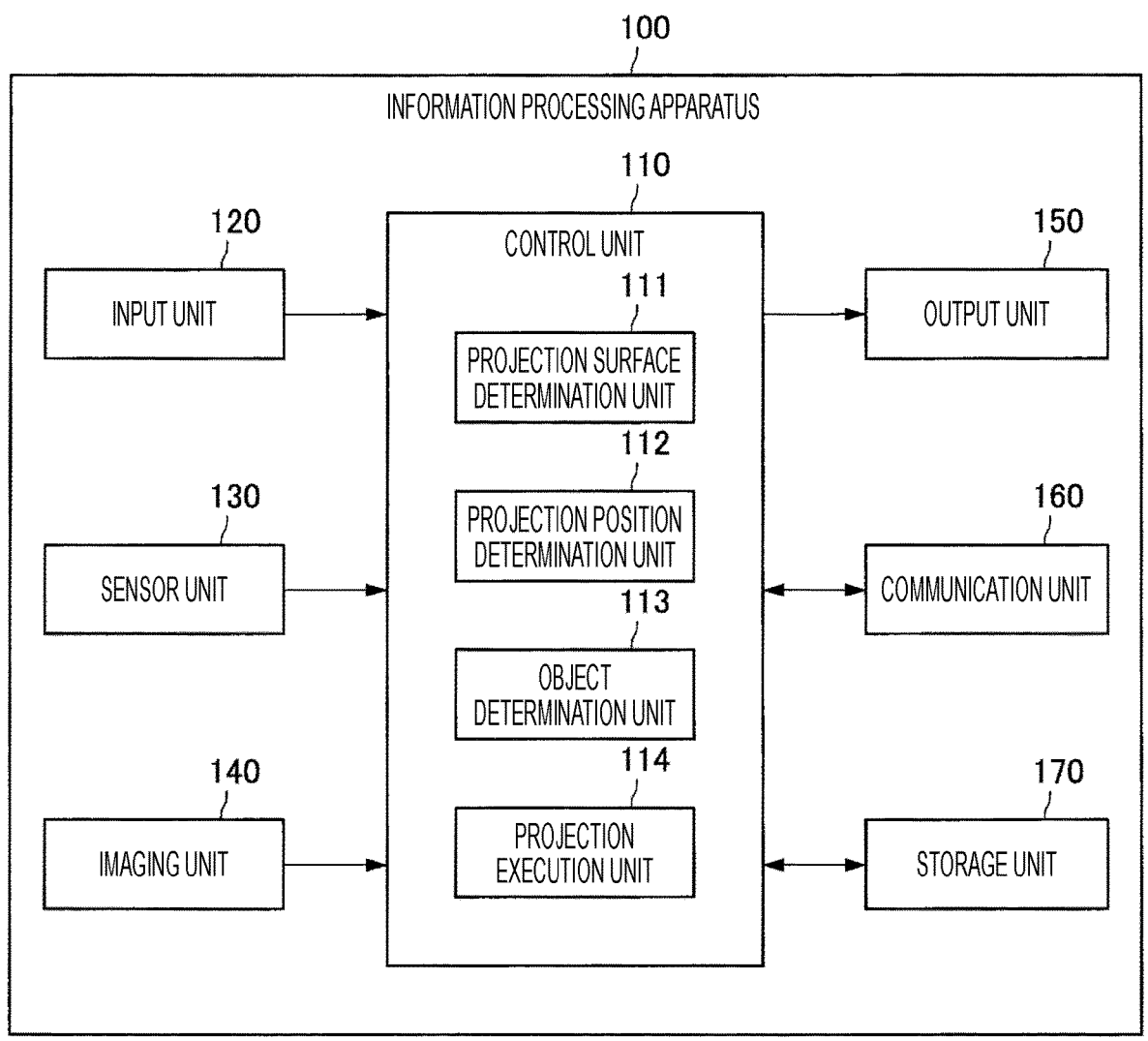
FIG. 4 is a block diagram illustrating a function configuration example of an information processing apparatus 100 according to the first example.

As illustrated in FIG. 4, the information processing apparatus 100 includes a control unit 110, an input unit 120, a sensor unit 130, an imaging unit 140, an output unit 150, a communication unit 160, and a storage unit 170.

(Control Unit 110)

The control unit 110 is a function configuration that collectively controls general processing the information processing apparatus 100 performs. For example, the control unit 110 can control activation and stop of each configuration on the basis of input performed by the user using the input unit 120 and control the output unit 150, e.g., a display or a speaker. Furthermore, the control unit 110 can function as an acquisition unit that acquires the message. Note that the control content of the control unit 110 is not limited to the above. For example, the control unit 110 may control processing that is generally performed in an agent apparatus, a general-purpose computer, a PC, a tablet PC, a smartphone, or the like.

Furthermore, the control unit 110 is also a function configuration that recognizes a context using a variety of sensor information sensed by the sensor unit 130, captured image information generated by the imaging unit 140, or the like. Here, the context is a concept that entirely includes situations or environments where the user is in, states, actions or the like of the user. Note that the method of recognizing the context is not particularly limited, but it is sufficient if a publicly known context recognition technology used.

Then, the control unit 110 can control the projection of an object on the basis of the recognized context. More specifically, on the basis of the context, the control unit 110 can control whether to project an object such that a direction from the user to the message transmission source apparatus is indicated (first example), whether to project a separation distance between the user and the message transmission source apparatus (second example), and whether to project an object such that both a direction from the user to the message transmission source apparatus and a separation distance between the user and the message transmission source apparatus is indicated (third example).

For example, regarding the notification of the message from the information processing apparatus 100 present in a house, it is assumed that the projection of an object is performed such that a direction to the information processing apparatus 100 is indicated on the basis of the attribute of the message (first example). Then, in a case where if the control unit 110 recognizes the context in which the user looks for the own apparatus in the house, the control unit 110 may perform switching to a method (third example) that projects an object such that not only a direction from the user to the information processing apparatus 100, but also a separation distance between the user and the information processing apparatus 100 is indicated on the basis of the context. Thus, the user can more easily find the information processing apparatus 100. The object projection control based on the context is also referred to when the second example and the third example are described later.

Now, as illustrated in FIG. 4, the control unit 110 includes a projection surface determination unit 111, a projection position determination unit 112, an object determination unit 113, and a projection execution unit 114.

(Projection Surface Determination Unit 111)

The projection surface determination unit 111 is a function configuration that determines the projection surface to which projection is performed (synonymous with the display of the display apparatus 200 in the present example). More specifically, the projection surface determination unit 111 determines a projection surface that can be visually recognized by the user as a projection target. For example, the projection surface determination unit 111 analyzes a variety of sensor information provided by the sensor unit 130 so as to recognize the position, the posture, the action or the like of the user and output the projection surface that can be visually recognized by the user on the basis of such information. In a case where a plurality of projection surfaces that can be visually recognized by the user is present, the projection surface determination unit 111 outputs an optimum (in other words, the most visually recognizable for the user) projection surface. Then, the projection surface determination unit 111 provides the determined projection surface to the projection position determination unit 112.

Note that the method for determining the projection surface to which projection is performed is not limited to the above. More specifically, the projection surface determination unit 111 may analyze not only the sensor information from the sensor unit 130, but also sensor information provided from any external apparatus to recognize the position, the posture, the action or the like of the user and may acquire the information associated with the position, the posture, the action or the like of the user from the external apparatus. Furthermore, the projection surface determination unit 111 may determine the projection surface to which projection is performed on the basis of not only from the position, the posture, the action or the like of the user, but also the state of the display apparatus 200 (e.g., a state related to power on/off, a state related to display mode, or the like).

Furthermore, in the above, description is given of an example in a case where the projection surface is the display of the display apparatus 200, but it is not limited to this. For example, the projection surface may be a projecting surface to which projection can be performed by a projector or the like, e.g., a screen.

(Projection Position Determination Unit 112)

The projection position determination unit 112 is a function configuration that determines the position of the projection surface to which projection is performed. More specifically, the projection position determination unit 112 outputs point P1_in of FIG. 1 or 2. The method for outputting point P1_in is described above and description will be omitted. The projection position determination unit 112 provides information associated with the position to which projection is performed to the projection execution unit 114.

(Object Determination Unit 113)

The object determination unit 113 is a function configuration that determines the content of an object to be projected to the projection surface. For example, the object determination unit 113 may determine the content of the object on the basis of privacy of the message. For example, in a case where the message received by the information processing apparatus 100 includes content of personal information or the like, the object determination unit 113 may determine not the content of the message, but an icon corresponding to the message as the object.

Furthermore, the object determination unit 113 may determine the content of the object on the basis of the attribute of the message. More specifically, the object determination unit 113 may determine the content of the object on the basis of the type or the like (or classification, category or the like) of message, which is a type of the attribute of the message.

Furthermore, the object determination unit 113 may determine the content of the object on the basis of the context recognized by the control unit 110. For example, as described above, even in a case where the privacy of the message is high, in a case where the context that is not visually recognized by a different user is recognized, the object determination unit 113 may determine the content of the message, not the icon corresponding to the message, as the object (in other words, the object determination unit 113 may determine the content of the object on the basis of the possibility that the object is visually recognized by a different user).

The object determination unit 113 provides information associated with the object for which the content is determined to the projection execution unit 114. Note that the method for determining the content of the object by the object determination unit 113 is not limited to the above.

(Projection Execution Unit 114)

The projection execution unit 114 is a function configuration that executes projection of an object to the projection surface. More specifically, the projection execution unit 114 generates control information that controls projection by the display apparatus 200 using information associated with the position where the projection is performed provided from the projection position determination unit 112 and information associated with the object provided from the object determination unit 113. Then, the projection execution unit 114 transmits the control information as the message via the communication unit 160. Thus, the display apparatus 200 can project the object to the projection surface using the control information.

(Input Unit 120)

The input unit 120 is a function configuration that receives input from the user. More specifically, the input unit 120 includes various input devices including a mouse, a keyboard, a touch panel, a button, a switch, or the like, and receives input performed using these input devices. The input unit 120 provides the input information to the control unit 110. Note that the input means is not limited to the above.

(Sensor Unit 130)

The sensor unit 130 is a function configuration that collects a variety of sensor information related to situations or environments where the user is in, or a state, an action or the like of the user. The type of sensor information the sensor unit 130 collects is not particularly limited. Examples of the sensor information collected by the sensor unit 130 include information output by any sensor including an acceleration sensor, gyro sensor, a geomagnetic sensor, a barometric sensor, a temperature sensor, a vibration sensor, a heartbeat sensor, a pulse wave sensor, a proximity sensor, an illuminance sensor, a pressure sensor, a sound sensor, a position sensor (e.g., global navigation satellite system (GNSS) sensor), a sweat sensor, a pH sensor, a humidity sensor, an infrared sensor, or the like. Note that the sensor unit 130 may collect the sensor information from an external apparatus including these various sensors. The sensor unit 130 provides the collected sensor information to the control unit 110.

(Imaging Unit 140)

The imaging unit 140 is a function configuration that captures an image of the user or a surrounding environment. More specifically, the imaging unit 140 includes an image sensor (e.g., charge-coupled device (CCD) sensor or a complementary metal oxide semiconductor (CMOS) sensor, or the like), and captures an image of the user or a surrounding environment using the sensor. Then, the imaging unit 140 provides the generated captured image information to the control unit 110. Note that the aforementioned image includes a moving image in addition to a still image.

(Output Unit 150)

The output unit 150 is a function configuration that outputs a variety of information. For example, the output unit 150 can output a variety of information to, for example, a display means, e.g., a display, or a sound output means, e.g., a speaker or an amplifier. Note that the output means is not limited to the above.

(Communication Unit 160)

The communication unit 160 is a function configuration that performs a variety of communication with the external apparatus including the display apparatus 200. For example, the communication unit 160 receives the message or the like from the external apparatus or transmits the control information generated by the projection execution unit 114 to the display apparatus 200 as the message. Note that the information communicated by the communication unit 160 and the case of communication are not limited to the above. Furthermore, the communication method of the communication unit 160 is not particularly limited.

(Storage Unit 170)

The storage unit 170 is a function configuration that stores a variety of information. For example, the storage unit 170 can store information associated with coordinates of each of points constituting the information processing apparatus 100, the display apparatus 200, and other real objects of an orthogonal coordinate system of a three-dimensional space, information associated with the message transmitted or received by the information processing apparatus 100, information associated with the object to be projected, or the like. Furthermore, the storage unit 170 stores various programs, various parameters, or the like used for processing by the information processing apparatus 100. Note that the information stored by the storage unit 170 is not limited to the above.

In the above, a functional configuration example of the information processing apparatus 100 is described. Note that the aforementioned function configurations described in conjunction with FIG. 4 are mere examples, and the function configuration of the information processing apparatus 100 is not limited to the above examples. For example, the information processing apparatus 100 may not necessarily include all the configurations illustrated in FIG. 4. Furthermore, the function configuration of the information processing apparatus 100 can be flexibly modified depending on the specification or operation.

(2.3. Processing Example of Information Processing Apparatus 100)

Figure 5:
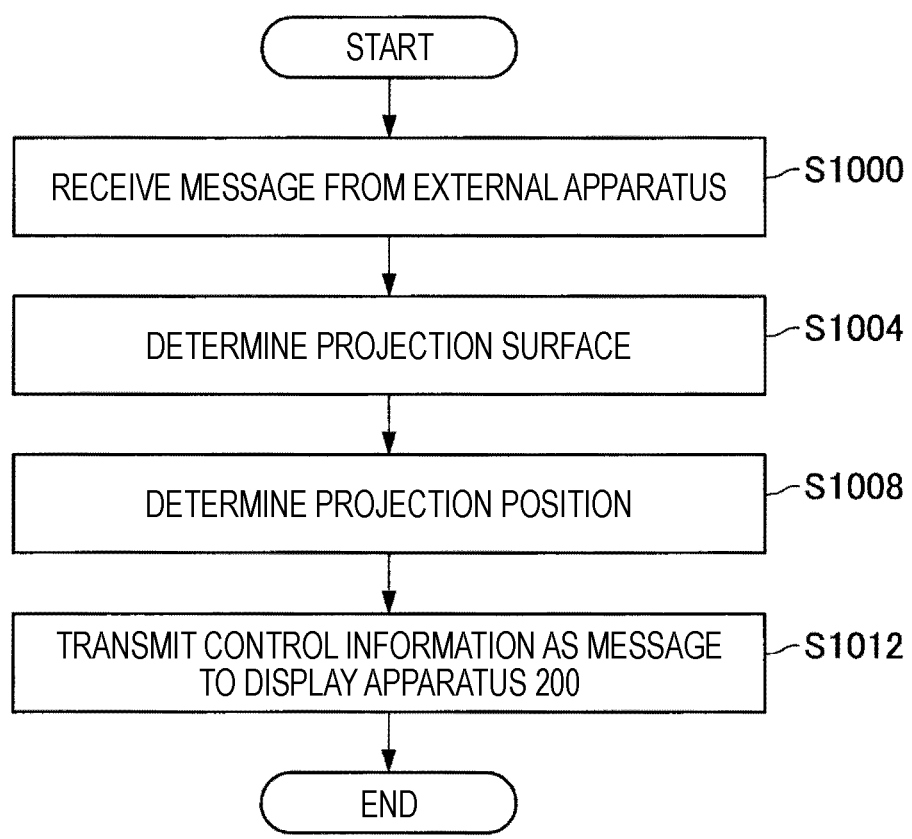
FIG. 5 is a flowchart illustrating a processing example of the information processing apparatus 100 according to the first example.

In the above, a functional configuration example of the information processing apparatus 100 is described. Next, a processing example of the information processing apparatus 100 is described with reference to FIG. 5. FIG. 5 is a flowchart illustrating a processing example in which the information processing apparatus 100 that has received the message from the external apparatus transmits the control information to the display apparatus 200 as the message.

In step S1000, the communication unit 160 of the information processing apparatus 100 receives the message from the external apparatus. In step S1004, the projection surface determination unit 111 determines a projection surface that can be visually recognized by the user as a projection target. In step S1008, the projection position determination unit 112 determines the position of the projection surface to which projection is performed. In step S1012, the projection execution unit 114 uses the information or the like associated with the position to which projection is performed provided from the projection position determination unit 112 to generate the control information that controls projection to the display apparatus 200. Then, when the projection execution unit 114 transmits the control information as the message via the communication unit 160, a series of processing by the information processing apparatus 100 ends. By the above processing, the display apparatus 200 can project the object to the projection surface using the control information.

Note that each step of the flowchart illustrated in FIG. 5 is not necessarily needed to be processed in chronological order along the described order. In other words, each step of the flowchart may be processed in an order that differs from the described order or may be processed in parallel.

2.4. First Modification

In the above, a processing example of the information processing apparatus 100 is described. Next, a first modification according to the present example is described. In the above, the projection surface is the display of the display apparatus 200. The first modification is an example related to the case where a region where projection is performed by a projector or the like (hereinafter the "projection region 210") is the projection surface.

Figure 6:
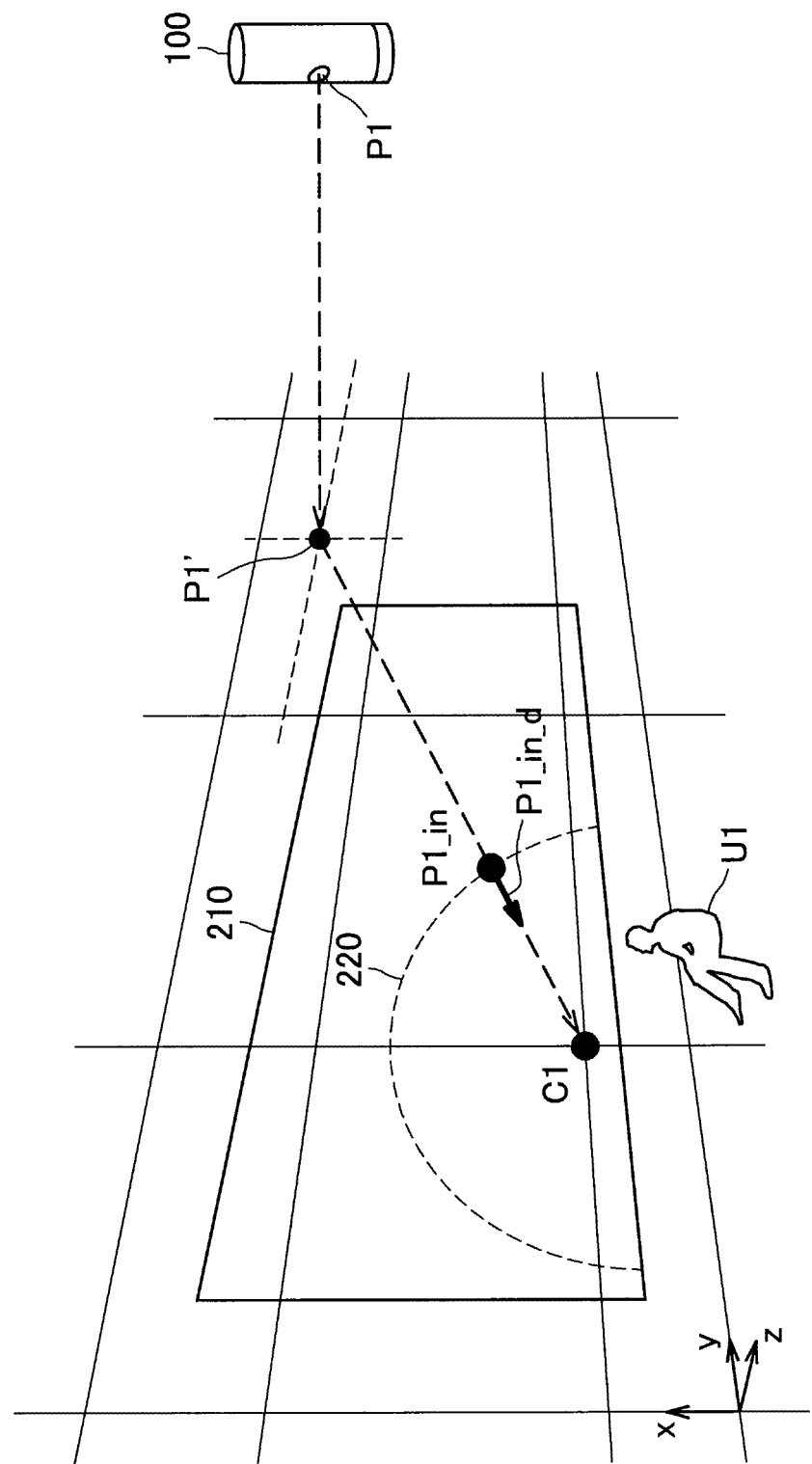
FIG. 6 is a diagram for explaining the first modification.

More specifically, as illustrated in FIG. 6, the projection region 210 has an area larger than the display of the display apparatus 200 in the above example, and various objects (including a still image, a moving image, or the like) can be projected. Note that the size and shape of the projection region 210 are not particularly limited. Furthermore, the projection region 210 is not necessarily needed to be provided on a flat surface, but may be provided on an uneven surface, a curved surface, or the like.

Furthermore, the apparatus that projects the object to the projection region 210 is also not particularly limited. For example, the information processing apparatus 100 may have a function that can project the object to the projection region 210, or the external apparatus, e.g., a projector, that can communicate with the information processing apparatus 100 may project the object to the projection region 210. Thereafter, as an example, description is given of the case where the external apparatus, e.g., a projector, that can communicate with the information processing apparatus 100 projects the object to the projection region 210.

In the first modification, as illustrated in FIG. 6, a recognition region 220 is formed within the projection region 210. The recognition region 220 indicates a region that can be recognized by the user U1 positioned in front of the projection region 210. In other words, the object that is projected within the projection region 210 and within the recognition region 220 can be recognized by the user U1. Meanwhile, the object that is projected within the projection region 210 but outside the recognition region 220 is recognized by the user U1.

The information processing apparatus 100 outputs the recognition region 220 on the basis of the positional relationship or the like between the projection region 210 and the user U1. For example, the information processing apparatus 100 may output a region within an intersection line between a sphere having any radius from the central point of the head of the user U1 and the projection region 210 as the recognition region 220. Note that the radius of the sphere may be changed properly depending on a separation distance between the user U1 and the projection region 210, a state of the user U1, or the like (e.g., posture, direction of line of sight, eyesight, concentration, or the like).

Furthermore, insofar a region where the object can be recognized by the user U1 is calculated, the method for outputting the recognition region 220 is not limited to the above. For example, the method for outputting the recognition region 220 may be changed properly depending on the size of the object projected to the projection region 210 by the information processing apparatus 100 (including, for example, the size of letters included in the object), the shape of a surface where the projection region 210 has been formed (e.g., a state of unevenness or the like), the separation distance between the user U1 and the projection region 210, a state of the user U1 or the like (e.g., posture, direction of line of sight, eyesight, concentration, or the like).

Also in the first modification, the information processing apparatus 100 controls the projection on the basis of the attribute of the message. The specific examples of the attribute of the message are as described above. Also in the first modification, similar to the aforementioned example, the information processing apparatus 100 achieves projection that indicates a direction from the user U1 to the message transmission source apparatus.

More specifically, the information processing apparatus 100 recognizes coordinates in which each of points constituting the own apparatus, the user U1, the projection region 210, the recognition region 220 and other real objects is located on an orthogonal coordinate system of a three-dimensional space. Then, as illustrated in FIG. 6, the information processing apparatus 100 calculates intersection P1' obtained when a normal line is drawn from central point P1 of the own apparatus toward a parallel surface passing through the projection region 210. Then, the information processing apparatus 100 calculates an intersection P1_in between a straight line, which passes central point C1 of the recognition region 220 and the intersection P1', and an end of the recognition region 220. Finally, the information processing apparatus 100 projects any object for notifying the user U1 of the message near intersection P1_in (e.g., a position after moving by a predetermined distance from intersection P1' in a direction P1_in_d of intersection P1_in with reference to the vicinity of intersection P1_in).

Note that the information processing apparatus 100 provides the control information including information associated with the content of the object and the object projection position to the projector that can communicate with the information processing apparatus 100 so as to achieve the aforementioned projection (of course, the information processing apparatus 100 itself has a function of the projector).

Thus, the user U1 can intuitively recognize the direction to the information processing apparatus 100, which is a message transmission source apparatus. Therefore, particularly, even in a case where a plurality of apparatuses having a function similar to that of the information processing apparatus 100 is present in a limited space such as a house or a facility, the user U1 can intuitively specify the information processing apparatus 100 that is a transmission source.

Figure 7:
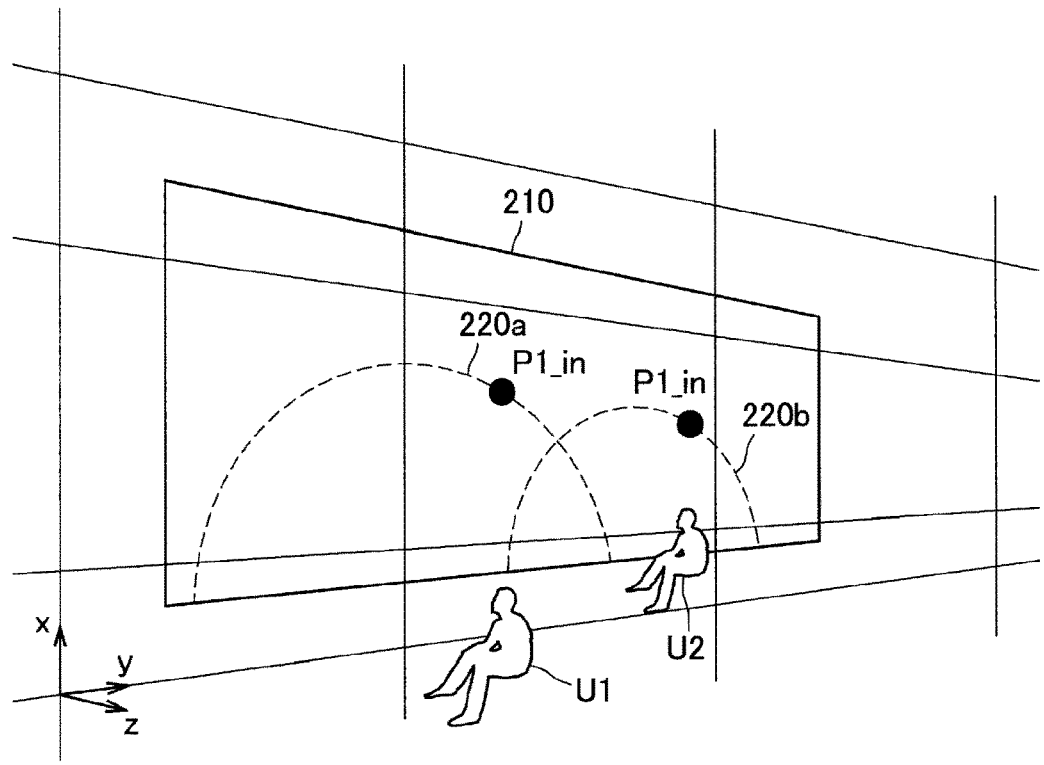
FIG. 7 is a diagram for explaining the first modification.

Furthermore, even in a case where the number of users is plural, similar processing may be performed. More specifically, as illustrated in FIG. 7, it is assumed that, in addition to the user U1, user U2 is present in a state of being capable of visually recognizing the projection region 210, and a recognition region 220a of the user U1 and a recognition region 220b of the user U2 are formed to be partially overlapped.

Even in such a situation, the information processing apparatus 100 calculates the point P1_in with respect to the recognition region 220a of the user U1 and the recognition region 220b of the user U2 so as to be able to project any object for giving a notification of the message in the vicinity of point the P1_in. Thus, not only the user U1 but also the user U2 can intuitively recognize the direction to the information processing apparatus 100, which is a message transmission source apparatus. Note that if the separation distance between the points P1_in corresponding to the recognition region 220a of the user U1 and the recognition region 220b of the user U2 is equal to or less than a predetermined value, the information processing apparatus 100 may project a common object to the same position (e.g., in the vicinity of the position of one of the points P1_in, in the vicinity of an intermediate point between the two points P1_in, or the like).

Note that the information processing apparatus 100 according to the first modification may determine whether or not to project the object (in particular, in a case where the number of users is plural) or whether or not to perform projection with respect to each user in a case where the number of users is plural. For example, the information processing apparatus 100 may determine whether or not to project the object on the basis of the attribute of the message or whether or not to perform projection with respect to each user in a case where the number of users is plural. More specifically, it is assumed that the information processing apparatus 100 has determined that when the information processing apparatus 100 receives the message, there is no problem even if the message is recognized by either the user U1 or the user U2 on the basis of the attribute of the message. In this case, as illustrated in FIG. 7, the information processing apparatus 100 projects the object with respect to the recognition region 220a of the user U1 and the recognition region 220b of the user U2.

Figure 8:
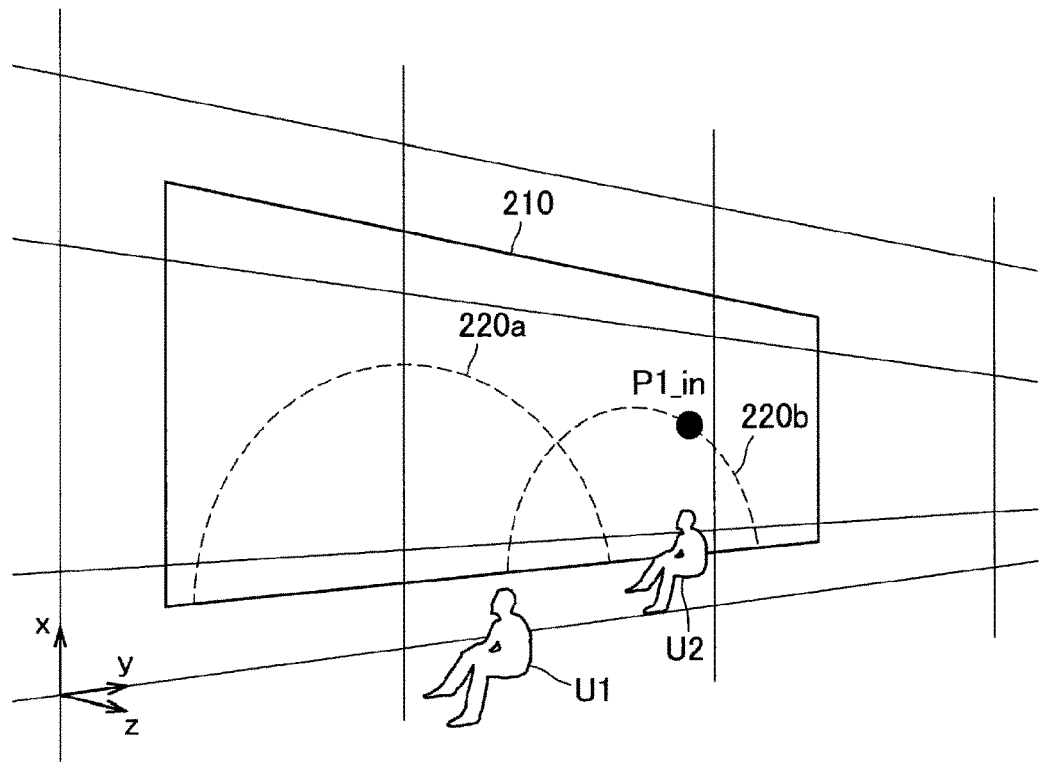
FIG. 8 is a diagram for explaining the first modification.

Meanwhile, it is assumed that the information processing apparatus 100 has determined that there is a problem when the message is recognized by the user U1 on the basis of the attribute of the message (e.g., in a case where the message relates to adult content and the user U1 is a minor, or the like). In this case, as illustrated in FIG. 8, the information processing apparatus 100 may not project the object to the recognition region 220a of the user U1, but may project the object only to the recognition region 220b of the user U2.

Note that the method of determination as to whether or not to project the object or the like is not limited to the above. For example, the information processing apparatus 100 may determine whether or not to project the object or the like, for example, on the basis of the content of the message in addition to the attribute of the message. More specifically, the information processing apparatus 100 when recognizing the message recognizes the content of the message by analyzing the content of the message. Then, the information processing apparatus 100 may determine whether or not to project the object or the like by determining as to whether or not it is appropriate to notify the user of the message. Note that the similar determination processing may be applied to examples other than the first modification.

Furthermore, in the first modification, the number of recognition regions 220 of one user may be provided in plural. More specifically, a region that can be recognized by the user without movement of the face or the eyes may be provided as a first recognition region 220, and a region that can be recognized by the user with the movement of the face or the eye may be provided as a second recognition region 220. Then, the information processing apparatus 100 may control projection of the object to the first recognition region 220 and the second recognition region 220. For example, the information processing apparatus 100 may project an object related to a massage having higher priority to the first recognition region 220 and may project an object related to a message having a lower priority to the second recognition region 220. Furthermore, the information processing apparatus 100 may project the object to the first recognition region 220 at a time of start of indication of the object and may move the object to the second recognition region 220 after a lapse of predetermined time. There is a possibility that the object that is in a state of being always within the user's field of vision provides a discomfort feeling to the user. However, such a problem can be solved when a plurality of the recognition regions 220 is provided to enable proper use.

Here, a functional configuration example of the information processing apparatus 100 according to the first modification is described with reference to FIG. 9. Note that thereafter for avoidance of duplicate description, only differences with respect to the function configuration example (see FIG. 4) of the information processing apparatus 100 according to the aforementioned examples are described.

The projection surface determination unit 111 according to the first modification is a function configuration that determines the projection region 210 where the projection is performed. More specifically, the projection surface determination unit 111 determines the projection region 210 that can be visually recognized by the user as a projection target. For example, the projection surface determination unit 111 analyzes a variety of sensor information provided by the sensor unit 130 so as to recognize the position, the posture, the action or the like of the user and output the projection region 210 that can be visually recognized by the user on the basis of such information. When the number of the projection regions 210 that can be visually recognized by the user is plural, the projection surface determination unit 111 outputs an optimum projection region 210. Then, the projection surface determination unit 111 provides the determined projection region 210 to the projection position determination unit 112. Note that, similar to the aforementioned examples, the method for determining the projection region 210 where projection is performed is not limited to the above.

Figure 9:
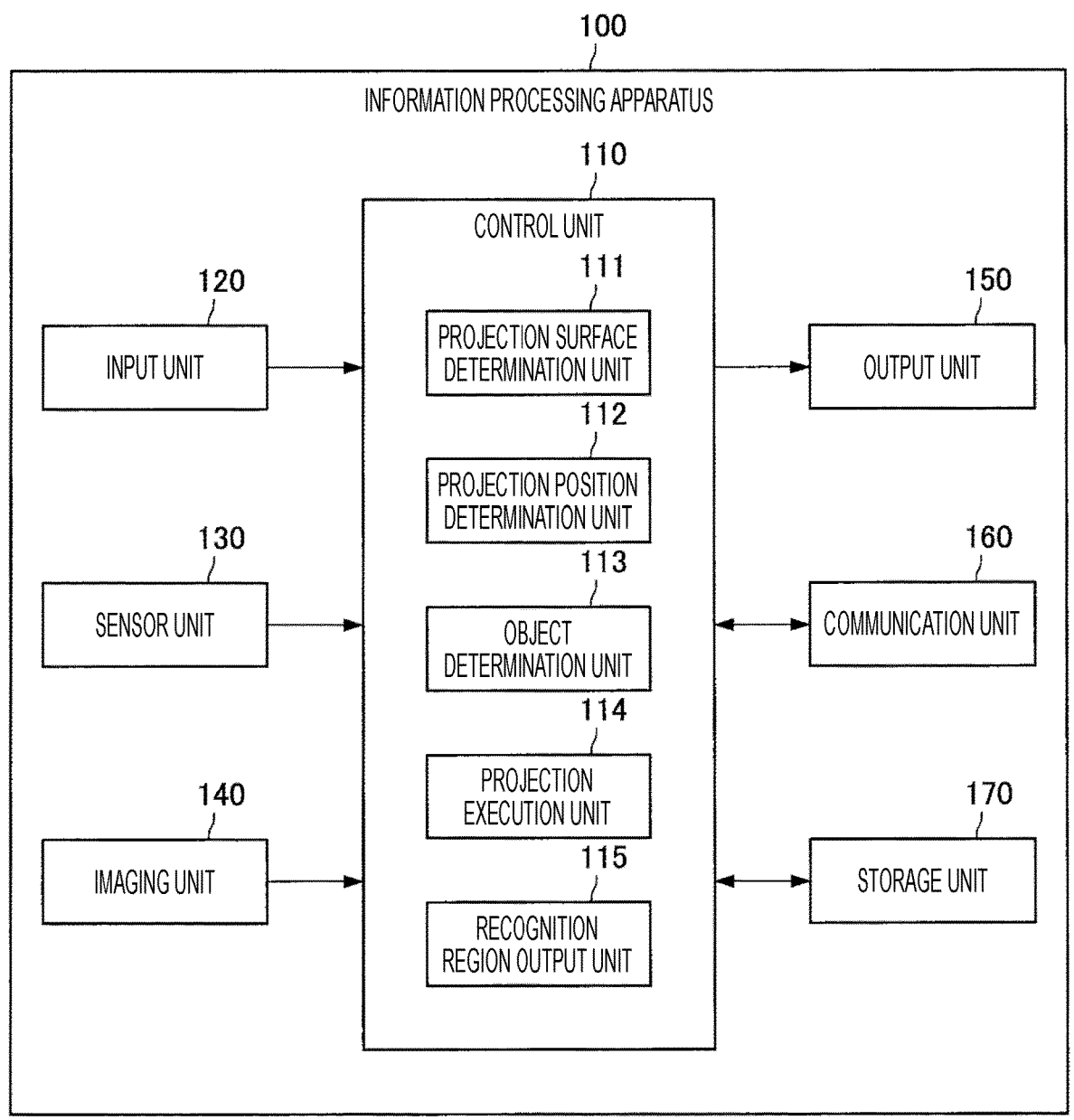
FIG. 9 is a block diagram illustrating a function configuration example of an information processing apparatus 100 according to a first modification.

Furthermore, as illustrated in FIG. 9, the information processing apparatus 100 according to the first modification includes a recognition region output unit 115 that is not included in the information processing apparatus 100 according to the aforementioned examples. The recognition region output unit 115 is a function configuration that outputs the recognition region 220 of the projection region 210. For example, the recognition region output unit 115 outputs a region within an intersection line between a sphere having any radius from the central point of the head of the user and the projection region 210 as the recognition region 220, but the method for outputting the recognition region 220 is not limited to this as described above. The recognition region output unit 115 provides information associated with the recognition region 220 to the projection position determination unit 112.

The projection position determination unit 112 is a function configuration that determines the position of the recognition region 220 to which projection is performed. More specifically, the projection position determination unit 112 outputs the point P1_in of FIGS. 6 to 8. The method for outputting point P1_in is described above and description will be omitted. The projection position determination unit 112 provides information associated with the position of the recognition region 220 to which projection is performed to the projection execution unit 114. Thus, the projection execution unit 114 can project the object to the position. Note that the other function configuration examples are similar to the function configuration examples of the information processing apparatus 100 according to the aforementioned examples (see FIG. 4).

Note that the aforementioned function configurations described in conjunction with FIG. 9 are mere examples, and the function configuration of the information processing apparatus 100 according to the first modification is not limited to the above examples. For example, the information processing apparatus 100 according to the first modification may not necessarily include all the configurations illustrated in FIG. 9. Furthermore, the function configuration of the information processing apparatus 100 according to the first modification can be flexibly modified depending on the specification or operation.

Figure 10:
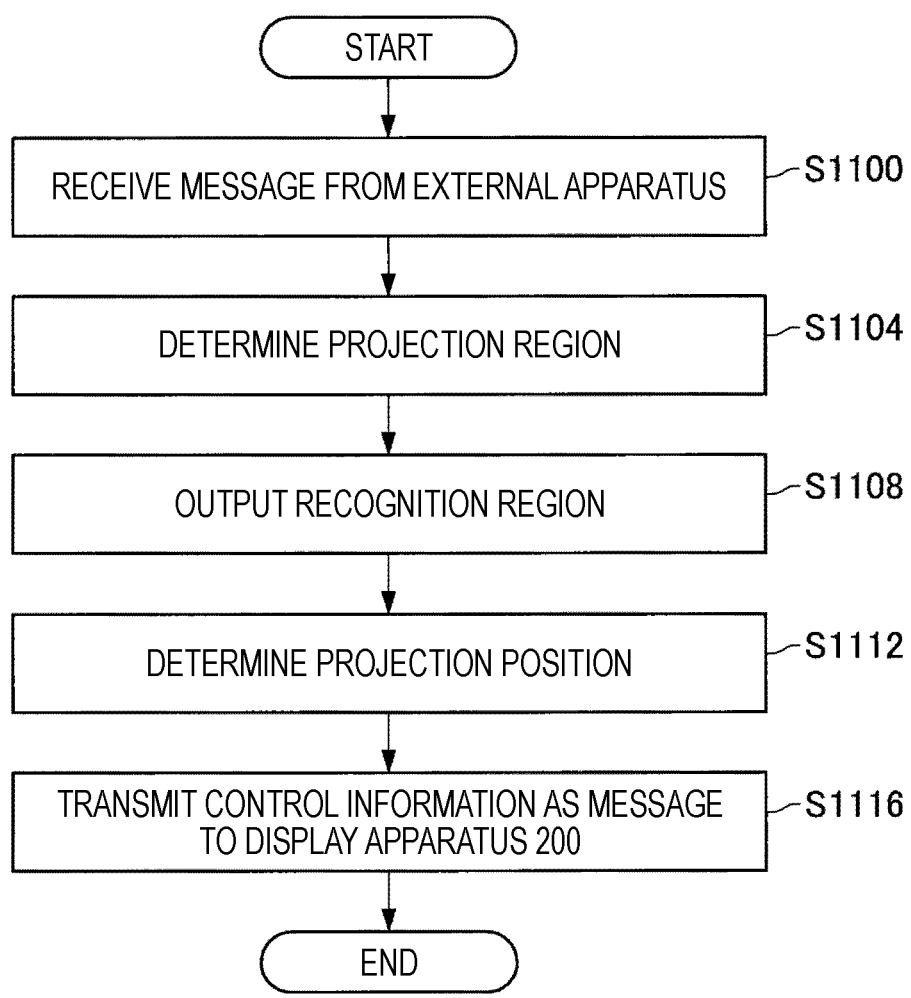
FIG. 10 is a flowchart illustrating a processing example of the information processing apparatus 100 according to the first modification.

Next, a processing example of the information processing apparatus 100 according to the first modification is described with reference to FIG. 10. FIG. 10 is a flowchart illustrating a processing example in which the information processing apparatus 100 according to the first modification that has received the message from the external apparatus transmits the control information to the display apparatus 200 as the message.

In step S1100, the communication unit 160 of the information processing apparatus 100 according to the first modification receives the message from the external apparatus. In step S1104, the projection surface determination unit 111 determines the projection region 210 that can be visually recognized by the user as a projection target. In step S1108, the recognition region output unit 115 outputs the recognition region 220 of the projection region 210. In step S1112, the projection position determination unit 112 determines the position of the recognition region 220 to which projection is performed. In step S1116, the projection execution unit 114 uses the information or the like associated with the position to which projection is performed provided from the projection position determination unit 112 to generate the control information that controls projection to the display apparatus 200. Then, when the projection execution unit 114 transmits the control information as the message via the communication unit 160, a series of processing by the information processing apparatus 100 according to the first modification ends. By the above processing, the display apparatus 200 can project the object to the recognition region 220 using the control information.

Note that each step of the flowchart illustrated in FIG. 10 is not necessarily needed to be processed in chronological order along the described order. In other words, each step of the flowchart may be processed in an order that differs from the described order or may be processed in parallel.

2.5. Second Modification

In the above, the first modification according to the present example is described. Next, a second modification according to the present example is described. In the first modification, the number of the projection regions 210 is one. Meanwhile, the second modification is an example related to a case where the number of the projection regions 210 is plural.

Figure 11:
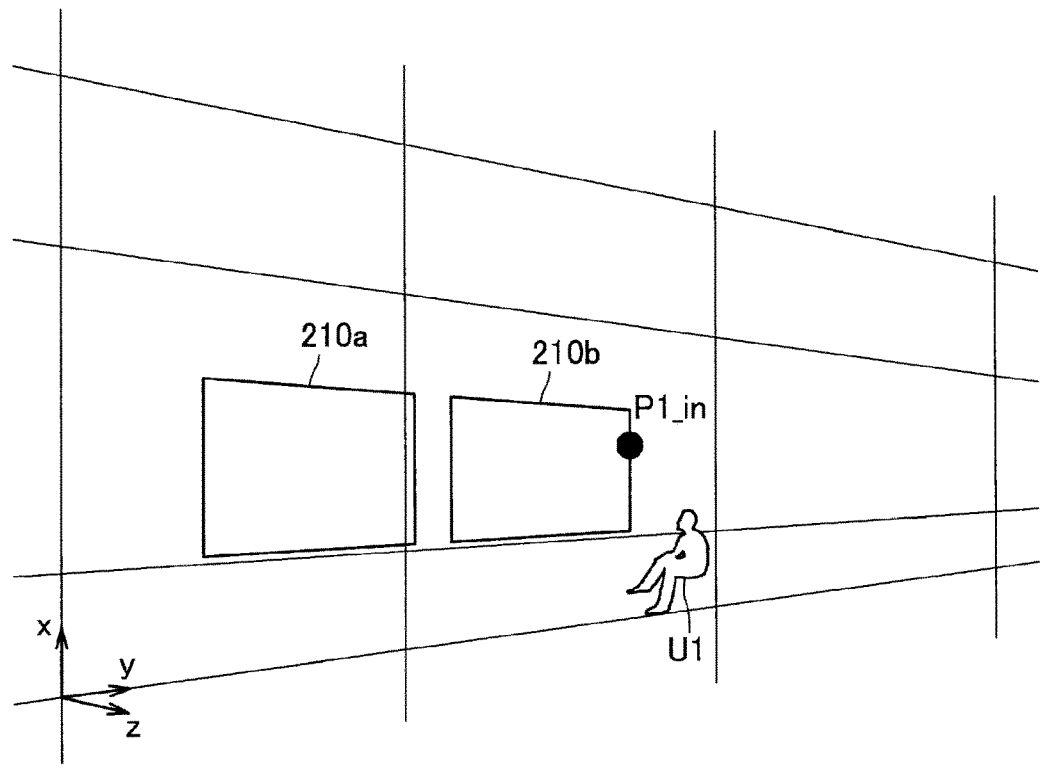
FIG. 11 is a diagram for explaining a second modification.

More specifically, as illustrated in FIG. 11, a projection region 210*a* and a projection region 210*b* are present, and the user U1 is present in front of them. Note that, also in the second modification, the size and shape of the projection region 210 are not particularly limited. Furthermore, the projection region 210 is not necessarily needed to be provided on a flat surface, but may be provided on an uneven surface, a curved surface, or the like. Furthermore, the apparatus that projects the object to the projection region 210 is also not particularly limited. Thereafter, as an example, description is given of the case where the external apparatus, e.g., a projector, that can communicate with the information processing apparatus 100 projects the object to the projection region 210. Furthermore, in the second modification, because the user U1 can generally recognize the projection region 210, the entire projection region 210 is the recognition region 220.

Also in the second modification, the information processing apparatus 100 controls the projection on the basis of the attribute of the message. The specific examples of the attribute of the message are as described above. Furthermore, also in the second modification, similar to the aforementioned example, the information processing apparatus 100 achieves projection that indicates a direction from the user U1 to the message transmission source apparatus.

More specifically, the information processing apparatus 100 recognizes coordinates in which each of points constituting the own apparatus, the user U1, the plurality of projection regions 210, the recognition region 220 and other real objects is located on an orthogonal coordinate system of a three-dimensional space.

Then, the information processing apparatus 100 determines projection region 210 to which the object is projected among the plurality of projection regions 210. More specifically, the information processing apparatus 100 determines a projection region 210 that can be visually recognized by the user (or that is easier for the user to recognize) among the plurality of projection regions 210 as the projection target. For example, information processing apparatus 100 analyzes a variety of sensor information provided by the sensor unit 130 so as to recognize the position, the posture, the action or the like of the user and output the projection region 210 that can be visually recognized by the user on the basis of such information. In the example of FIG. 11, the projection region 210b is closer to the user U1 than the projection region 210a. Therefore, the projection region 210b is selected as the projection region 210 that can be visually recognized by the user U1 (or that is easier for the user U1 to recognize).

Then, the information processing apparatus 100 calculates point P1_in at the projection region 210 (strictly, the recognition region 220 of the projection region 210) determined as the projection target by the method similar to that of the aforementioned first modification. Finally, the information processing apparatus 100 projects an object in a vicinity of point P1_in.

Thus, the user U1 can intuitively recognize the direction to the information processing apparatus 100, which is a message transmission source apparatus. Therefore, particularly, even in a case where a plurality of apparatuses having a function similar to that of the information processing apparatus 100 is present in a limited space such as a house or a facility, the user U1 can intuitively specify the information processing apparatus 100 that is a transmission source.

Note that, in the example of FIG. 11, the projection region 210a is in a position farther from the user U1. However, the object may be projected to the projection region 210a insofar as it is determined that the user U1 can visually recognize the projection region 210a (or the user U1 can more easily visually recognize the projection region 210a) on the basis of the line of sight or the like of the user U1.

Figure 12:
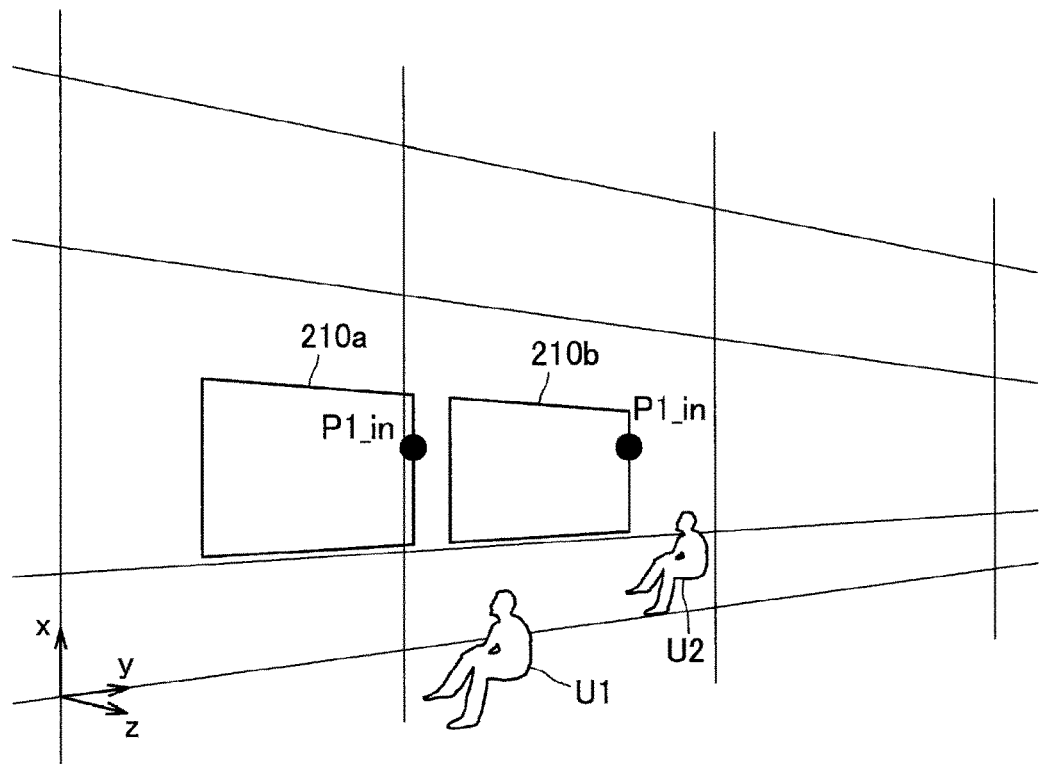
FIG. 12 is a diagram for explaining the second modification.

Furthermore, even in a case where the number of users is plural, similar processing may be performed. More specifically, as illustrated in FIG. 12, the projection region 210a is present in a state of being capable of being visually recognized by the user U1 and the projection region 210b is present in a state of being capable of being visually recognized by the user U2. Note that the recognition region 220 of the user U1 is the entire projection region 210a, and the recognition region 220 of the user U2 is the entire projection region 210b.

Even in such a situation, the information processing apparatus 100 according to the second modification calculates the point P1_in with respect to the projection region 210a (the recognition region 220 of the user U1) and the projection region 210b (the recognition region 220 of the user U2) so as to be able to project any object for giving a notification of the message in the vicinity of point the P1_in. Thus, not only the user U1 but also the user U2 can intuitively recognize the direction to the information processing apparatus 100, which is a message transmission source apparatus.

Note that, similar to the first modification, if the separation distance between the points P1_in corresponding to the projection region 210a and the projection region 210b is equal to or less than the predetermined value, the information processing apparatus 100 may project a common object to the same position. Furthermore, the information processing apparatus 100 may determine whether or not to project the object (particularly in a case where the number of users is plural).

Figure 13:
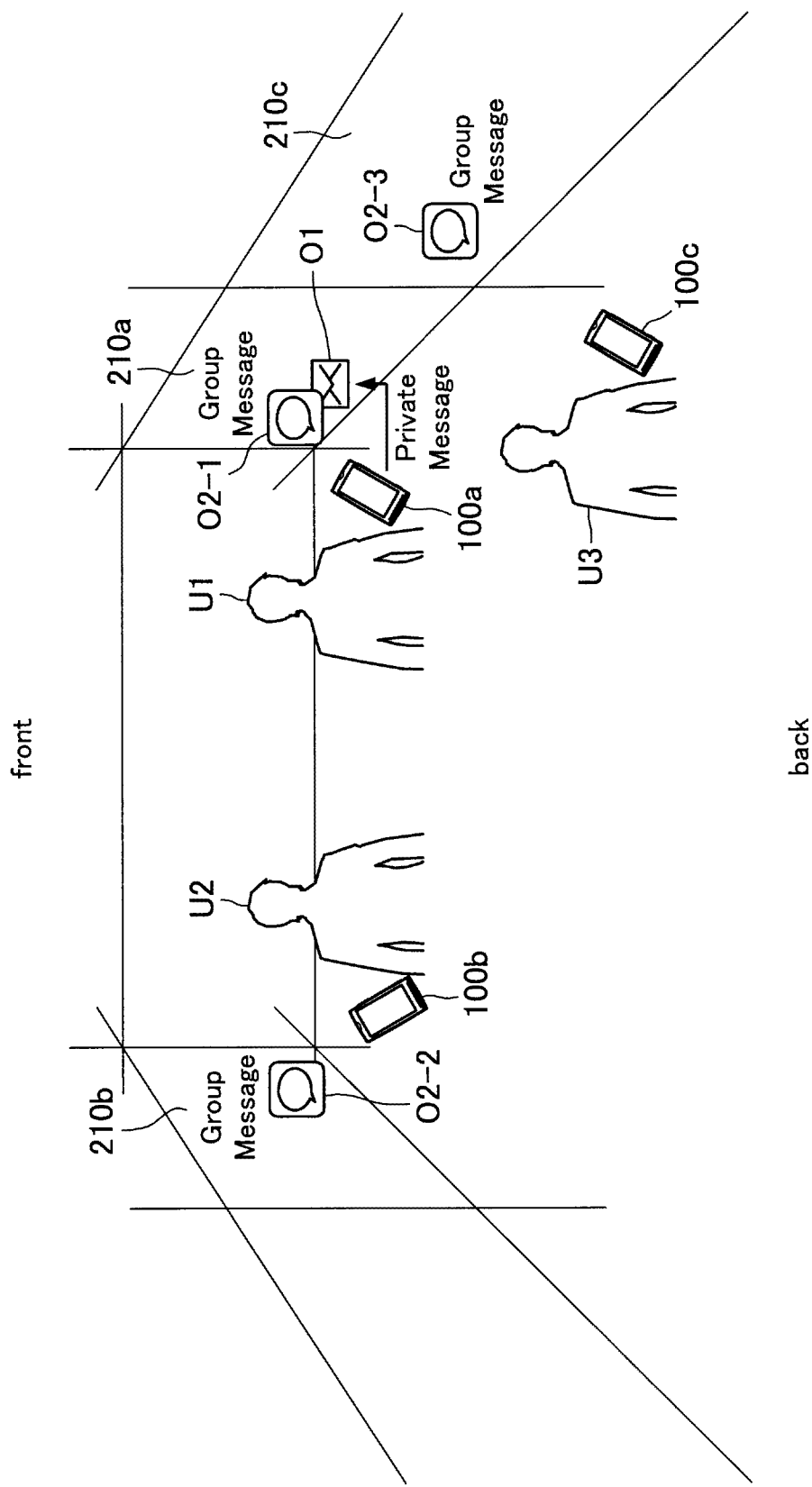
FIG. 13 is a diagram for explaining an example of a case in which the second modification has been applied to an on-vehicle system.

Here, referring to FIG. 13, description is given of an example of a case where the second modification described above is applied to an on-vehicle system.

FIG. 13 is a diagram briefly illustrating the inside of the vehicle in which a direction described as "front" in the drawing is the front side of the automobile and a direction described as "back" is the rear side of the automobile. Furthermore, a side surface window of a front seat (hereinafter called the "front side window") and a side surface window of a rear seat (hereinafter called the "rear side window") of an automobile are the projection regions 210 (in the drawing, projection region 210a to projection region 210c are described). Furthermore, smartphones owned by the user U1 to the user U3 function as an information processing apparatus 100a to an information processing apparatus 100c.

Then, for example, each information processing apparatus 100, in a case of receiving the message from the external apparatus, projects the object to the projection region 210 (recognition region 220) of each user. Thus, each user can recognize that the information processing apparatus 100 has received the message without removing the information processing apparatus 100. Furthermore, when the object is projected to the projection region 210 (recognition region 220) of each user, for example, as compared with the case where the object is projected to a predetermined position, e.g., windshield, the recognition of the message by a receiver becomes easier.

At this time, as described above, the information processing apparatus 100 can control the content of the object to be projected. For example, a case where the received message is a private message is considered (for example, a case where the destination of the message is only one user or a case where the message transmission source is not known to a different user around. In this case, the information processing apparatus 100 may project the content of the message as the object when the object is determined not to be recognized by the different user. Furthermore, the information processing apparatus 100 may project an icon (e.g., object O1 or the like of FIG. 13) corresponding to the message without projecting the content of the message when it is determined that there is a possibility that the object is recognized by the different user. Furthermore, the information processing apparatus 100 may not project the object when it is determined that there is a possibility that the object is recognized by the different user.

Meanwhile, a case where the received message is, for example, a public message that is shared by a certain group (e.g., a group chat, a group talk or the like). In this case, in a case where all users present in the vehicle belong to the group, the information processing apparatus 100 may project the content of the message as the object to the projection region 210 (recognition region 220) that can be recognized by everyone or may output the content of the message by a sound. Of course, the information processing apparatus 100 may project an icon (e.g., object O2-1 to object O2-3 or the like of FIG. 13) corresponding to the message without projecting the content of the message. Furthermore, in a case where only some of all the users present in the vehicle belong to the group, the information processing apparatus 100 may project the content of the message or the like as the object to the projection region 210 (recognition region 220) that can be recognized only by some users or may not project the object.

Note that even in a case of a public message, e.g., a group chat, in a case where the information processing apparatus 100 analyzes the message and recognizes that the message contains highly private information (e.g., a case where a user name that is not known to a specific user is contained in the message), the information processing apparatus 100 may take a response similar to that to the private message described above.

Furthermore, regarding a function configuration example and a processing example of the information processing apparatus 100 according to the second modification, description is omitted because they are similar to the function configuration example and the processing example of the information processing apparatus 100 according to the first modification described with reference to FIGS. 9 and 10.

Furthermore, in the above, the information processing apparatus 100 indicates a direction from the user to the message transmission source apparatus by the object projection position. However, an aspect of projection is not limited to the above. For example, like object O3 of FIG. 14, the information processing apparatus 100 may perform projection such that the projection position of the object O3 is fixed and a direction of arrow O3-1 of the object O3 matches a direction to the message transmission source apparatus.

Figure 14:
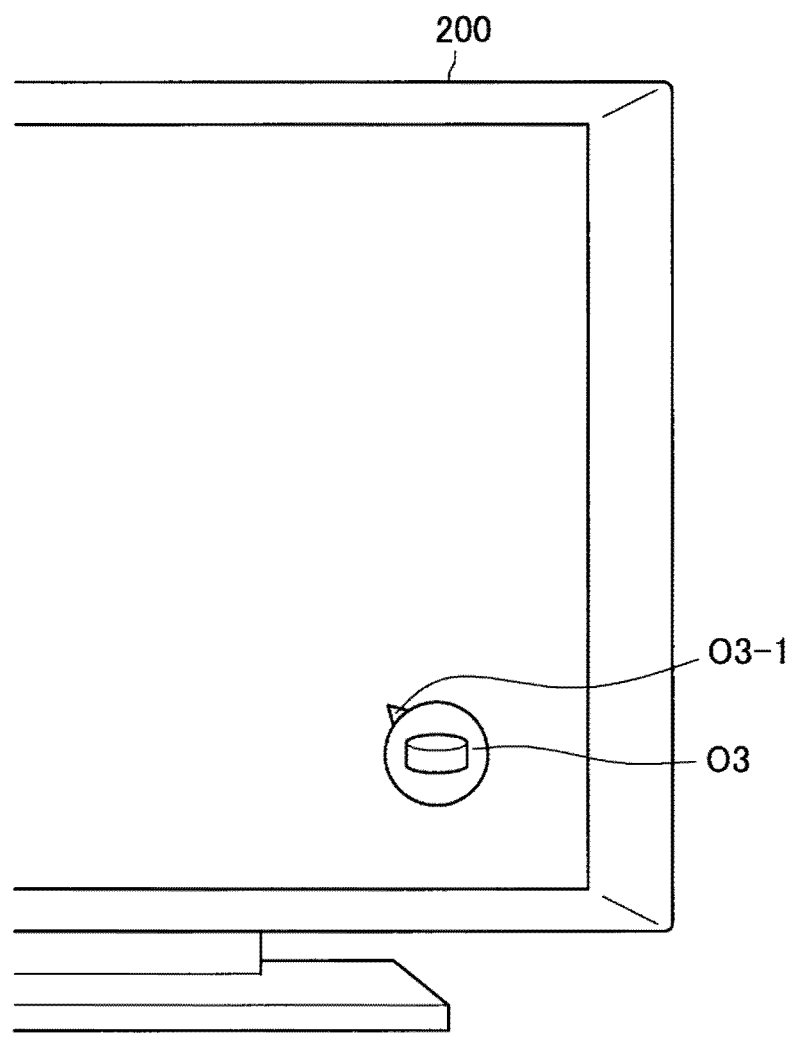
FIG. 14 is a diagram illustrating a variation of an object according to the first example.

Thus, for example, even in a case where the position of the projection surface or the recognition region 220 where the object can be projected is restricted, the information processing apparatus 100 can properly indicate a direction from the user to the message transmission source apparatus. Note that FIG. 14 is also a mere example of projection aspect, and its content can be changed properly.

3. SECOND EXAMPLE

In the above, the first example according to the present disclosure is described. Next, the second example according to the present disclosure is described. The second example is an example in which a separation distance between the user and the message transmission source apparatus is indicated by object projection control.

For example, in a case where the user waits for arrival of home delivery or food delivery, the user wants to know a separation distance between the user and a courier or the like. Thus, the information processing apparatus 100 according to the second example, in a case of receiving the message from the courier or the like, can indicate a separation distance between the user and the message transmission source apparatus by controlling projection on the basis of the attribute of the message.

Figure 15:
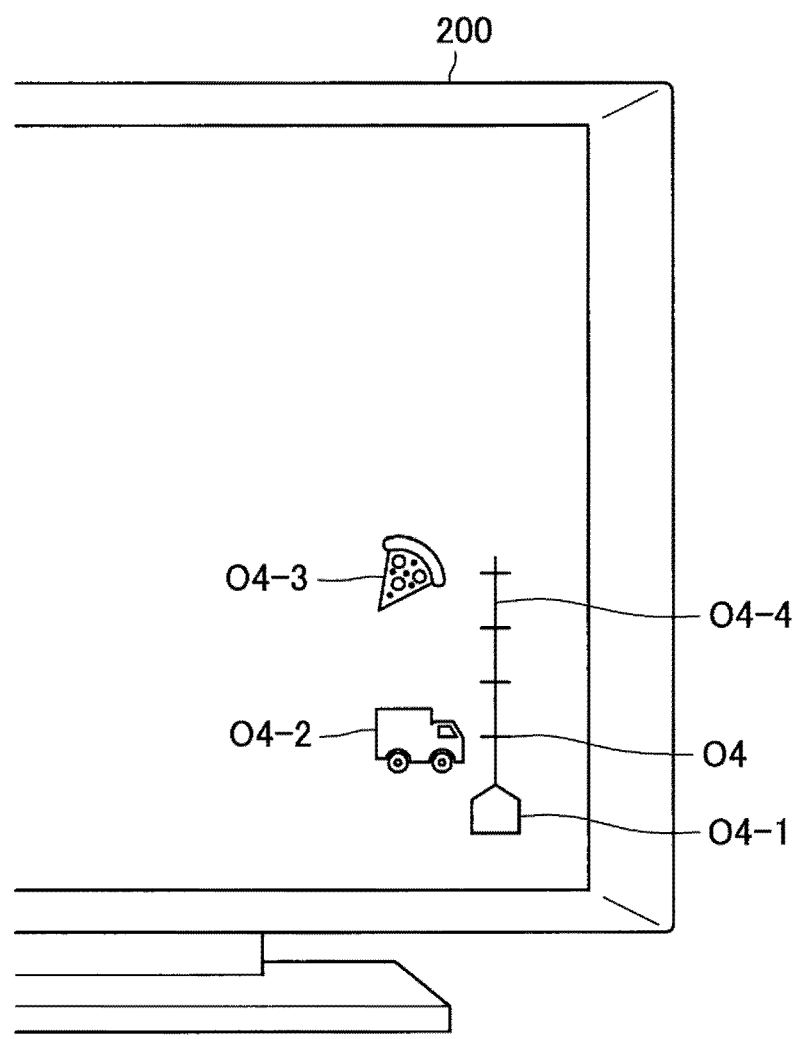
FIG. 15 is a diagram for explaining the second example according to the present disclosure.

For example, as illustrated in FIG. 15, the information processing apparatus 100 projects object O4 that indicates a separation distance between the user and the message transmission source apparatus to a predetermined position of the projection surface of the display apparatus 200 (alternatively, the recognition region 220 of the projection region 210). The object O4 includes an object O4-1 that indicates a user (or a building, e.g., a house in which the user is present), an object O4-2 that indicates a courier, an object O4-3 that indicates a food delivery courier, and a distance gauge O4-4 that indicates a distance to the user. When the positions of the object O4-2 and the object O4-3 on the distance gauge O4-4 are changed depending on a change of distance to the user, the user can intuitively recognize the relative positional relationship with respect to the courier and the food delivery courier.

Here, in the present example, the method for the information processing apparatus 100 to recognize the separation distance between the user and the courier or the like is not particularly limited. For example, when the message transmitted from the courier or the like contains sensor information of a GNSS sensor carried by the courier or the like, the information processing apparatus 100 may recognize the separation distance between the user and the courier or the like by analyzing the sensor information. Furthermore, the system of the courier or the like may calculate the separation distance between the user and the courier or the like to contain the information associated with the separation distance into the message such that the information processing apparatus 100 recognizes the separation distance between the user and the courier or the like.

Note that, an aspect of projection is not limited to FIG. 15. For example, the distance to the user may be indicated by any method, e.g., text (e.g., a numerical value or the like), color, the size of an object, or the like.

Here, a functional configuration example of the information processing apparatus 100 according to the second example is described. Note that thereafter for avoidance of duplicate description, only differences with respect to the function configuration example (see FIGS. 4 and 9) of the information processing apparatus 100 according to the aforementioned examples are described.

The projection position determination unit 112 according to the second example determines an object projection position. More specifically, the projection position determination unit 112 recognizes the separation distance between the user and the courier or the like, e.g., by analyzing the received message, to determine the projection position of the object O4-2 and the object O4-3 on the gauge O4-4. In other words, the projection position determination unit 112 changes the projection position of the object O4-2 and the object O4-3 on the distance gauge O4-4 depending on a change of the distance to the user.

Note that, as described above, since an aspect of projection is not limited to FIG. 15, in a case where the distance to the user is not indicated by the object projection position, the content of processing by the projection position determination unit 112 can be changed properly flexibly. For example, in a case where the distance to the user is indicated by a numerical value, the projection position determination unit 112 may recognize the distance to the user and determine the content of a numerical value to be projected (note that, in this case, the determination of a numerical value to be projected may be achieved by the object determination unit 113).

Furthermore, regarding the processing example of the information processing apparatus 100 according to the second example, which is similar to the content described with reference to FIGS. 5 and 10, description is omitted. Note that, for example, in step S1008 of FIG. 5, the projection position determined by the projection position determination unit 112 is the position of the object O4-2 and the object O4-3 on the gauge O4-4 in the example of FIG. 15.

Furthermore, as described in the aforementioned example, the information processing apparatus 100 can control the projection of the object on the basis of the recognized context. For example, in a case where the user utters "from which direction they come" while waiting for delivery, the information processing apparatus 100 may analyze the utterance and recognize the context to switch the method to an object projection method (third example) such that not only the separation distance between the user and the courier, but also a direction from the user to the courier is indicated.

4. THIRD EXAMPLE

In the above, the second example according to the present disclosure is described. Next, the third example according to the present disclosure is described. The third example is an example in which both a direction from the user to the message transmission source apparatus and a separation distance between the user and the message transmission source apparatus are indicated by object projection control.

For example, in a case where the user is waiting for a moving stall that passes by the home and thinks of going to buy an item when the moving stall passes by the home, the user wants to know both a direction of the moving stall and a distance to the moving stall. Thus, the information processing apparatus 100 according to the third example, in a case of receiving the message from the moving stall, can indicate both a direction from the user to the message transmission source apparatus and a separation distance between the user and the message transmission source apparatus by controlling projection on the basis of the attribute of the message.

Figure 16:
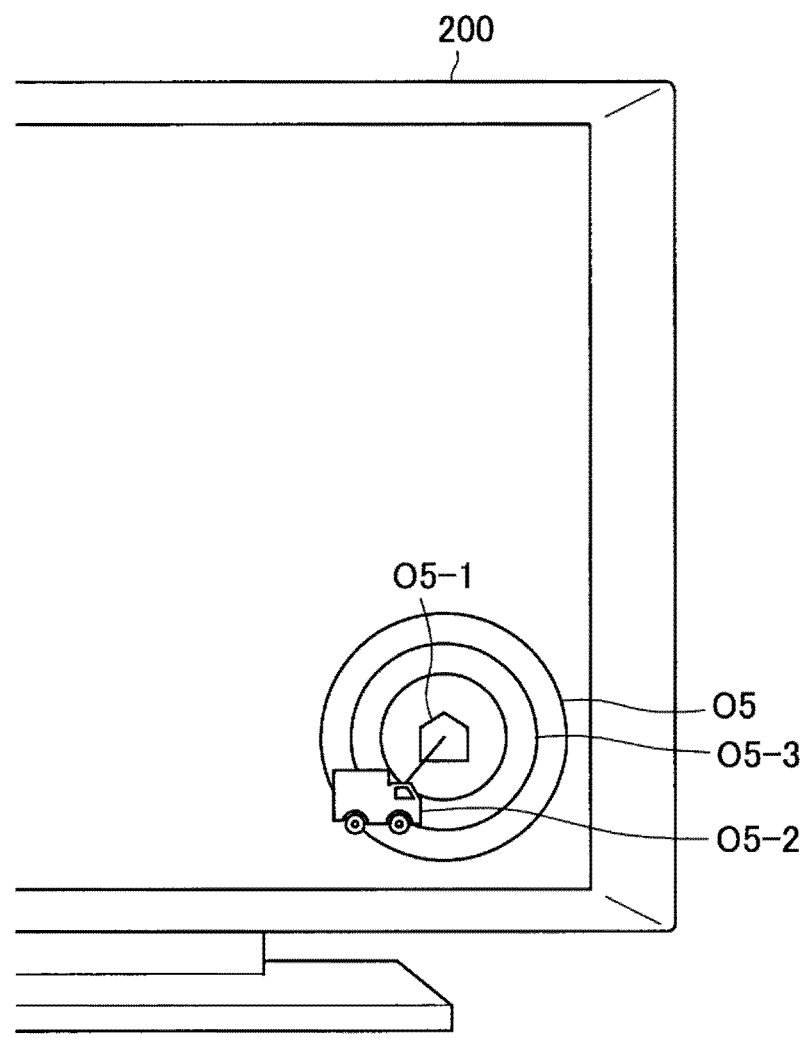
FIG. 16 is a diagram for explaining a third example according to the present disclosure.

For example, as illustrated in FIG. 16, the information processing apparatus 100 projects object O5 that indicates both a direction from the user to the message transmission source apparatus and a separation distance between the user and the message transmission source apparatus to a predetermined position of the projection surface of the display apparatus 200 (alternatively, the recognition region 220 of the projection region 210). The object O5 includes an object O5-1 that indicates a user (or a building, e.g., a house in which the user is present), an object O5-2 that indicates a moving stall, a concentric circle map O5-3 that indicates a direction of the moving stall and a distance to the moving stall. When the position of the object O5-2 on the concentric circle map O5-3 is changed on the same circle depending on a change in direction from the user to the moving stall, the user can intuitively recognize the direction of the moving stall. Furthermore, when the position of the object O5-2 on the concentric circle map O5-3 is changed to a circle having a smaller radius (or a circle having a larger radius) depending on a change in separation distance between the user and the moving stall, the user can intuitively recognize the distance to the moving stall.

Note that, similar to the second example, the method for the information processing apparatus 100 to recognize the direction and the distance to the moving stall is not particularly limited. Furthermore, an aspect of projection is not limited to FIG. 16. For example, the distance to the user may be indicated by any method, e.g., text (e.g., a numerical value or the like), color, the size of an object, or the like.

Here, a functional configuration example of the information processing apparatus 100 according to the third example is described. Note that thereafter for avoidance of duplicate description, only differences with respect to the function configuration example (see FIGS. 4 and 9) of the information processing apparatus 100 according to the aforementioned examples are described.

The projection position determination unit 112 according to the third example determines an object projection position. More specifically, the projection position determination unit 112 recognizes the direction and the distance to the moving stall, e.g., by analyzing the message received from the moving stall, to determine the projection position of the object O5-2 on the concentric circle map O5-3.

Note that, as described above, since an aspect of projection is not limited to FIG. 16, in a case where the direction and the distance to the moving stall are not indicated by the object position, the content of processing by the projection position determination unit 112 can be changed properly flexibly. For example, in a case where the direction and the distance to the moving stall are indicated by a numerical value, the projection position determination unit 112 may recognize the direction and the distance to the moving stall and determine the content of a numerical value to be projected (note that, in this case, the determination of a numerical value to be projected may be achieved by the object determination unit 113).

Furthermore, regarding the processing example of the information processing apparatus 100 according to the third example, which is similar to the content described with reference to FIGS. 5 and 10, description is omitted. Note that, for example, in step S1008 of FIG. 5, the projection position determined by the projection position determination unit 112 is the position of the object O5-2 on the concentric circle map O5-3 in the example of FIG. 16.

Furthermore, as described in the aforementioned example, the information processing apparatus 100 can control the projection of the object on the basis of the recognized context. For example, in a case where the user also orders food delivery while waiting for the moving stall, the information processing apparatus 100 may switch to the method (second example) for projecting the object to indicate the separation distance between the user and the moving stall and the food delivery courier by recognizing the context and determining that the separation distance between the user and the moving stall or the food delivery courier is more important than the direction of the moving stall or the food delivery courier.

5. HARDWARE CONFIGURATION EXAMPLE

In the above, the third example according to the present disclosure is described. Next, a hardware configuration example of the information processing apparatus 100 is described with reference to FIG. 17.

FIG. 17 is a diagram illustrating a hardware configuration of the information processing apparatus 100. The information processing apparatus 100 includes a central processing unit (CPU) 901, a read only memory (ROM) 902, a random access memory (RAM) 903, a host bus 904, a bridge 905, an external bus 906, an interface 907, an input apparatus 908, an output apparatus 909, a storage apparatus (HDD) 910, a drive 911, and a communication apparatus 912.

The CPU 901 functions as an arithmetic processing apparatus and a control apparatus and controls general operations in the information processing apparatus 100 according to various programs. Furthermore, the CPU 901 may be a microprocessor. The ROM 902 stores a program, an arithmetic parameter, or the like the CPU 901 uses. The RAM 903 temporarily stores a program used in execution of the CPU 901, a parameter that properly changes in the execution, or the like. They are interconnected by the host bus 904 including a CPU bus or the like. Cooperation between the CPU 901, the ROM 902, and the RAM 903 achieves each function of the control unit 110, the sensor unit 130, or the imaging unit 140 of the information processing apparatus 100.

The host bus 904 is connected to the external bus 906, e.g., a peripheral component interconnect/interface (PCI)

bus via the bridge 905. Note that it is not necessarily needed to separately configure the host bus 904, the bridge 905, and the external bus 906, and these functions may be mounted on a single bus.

The input apparatus 908 includes an input means for the user to input information, e.g., a mouse, a keyboard, a touch panel, a button, a microphone, a switch, and a lever, and an input control circuit that generates an input signal on the basis of the input by the user and outputs the input signal to the CPU 901, or the like. A person who uses the information processing apparatus 100 can input a variety of information or gives an instruction of processing operation to each apparatus by operating the input apparatus 908. The function of the input unit 120 is achieved by the input apparatus 908.

The output apparatus 909 includes a display apparatus, for example, a cathode ray tube (CRT) display apparatus, a liquid crystal display (LCD) apparatus, an organic light emitting diode (OLED) apparatus, and a lamp. Moreover, the output apparatus 909 includes a sound output apparatus, e.g., a speaker, a headphone, or the like. The output apparatus 909 outputs, for example, reproduced content. Specifically, the display apparatus displays a variety of information including reproduced video data by text or image. Meanwhile, the sound output apparatus converts reproduced sound data or the like into a sound and outputs the sound. The function of the output unit 150 is achieved by the output apparatus 909.

The storage apparatus 910 is an apparatus for data storage. The storage apparatus 910 may include a storage medium, a record apparatus that records data on the storage medium, a read apparatus that reads data from the storage medium, a removal apparatus that removes data recorded on the storage medium, or the like. The storage apparatus 910 includes, for example, a hard disk drive (HDD). The storage apparatus 910 drives a hard disk and a program or various data the CPU 901 executes. Each function of the storage unit 170 is achieved by the storage apparatus 910.

The drive 911 is a storage medium reader/writer, and is mounted on the information processing apparatus 100 internally or externally. The drive 911 reads information recorded on a removable storage medium 913, e.g., a magnetic disk, an optical disk, a magneto-optical disk, or a semiconductor memory, which is mounted, and outputs the information to the RAM 903. Furthermore, the drive 911 can write information onto the removable storage medium 913.

The communication apparatus 912 is, for example, a communication interface including a communication device or the like for connection to a communication network 914. Each function of the communication unit 160 is achieved by the communication apparatus 912.

6. CONCLUSION

As described above, the information processing apparatus 100 according to the present disclosure controls the projection of the object that notifies the user of the message on the basis of the attribute of the message. Thus, the information processing apparatus 100 can indicate the direction from the user to the message transmission source apparatus or the separation distance between the user and the message transmission source apparatus, to the user. Furthermore, the information processing apparatus 100 can further control the projection of the object on the basis of the context. Moreover, the information processing apparatus 100 can control the content of the object depending on the attribute of the message or the like.

The preferred embodiment(s) of the present disclosure has/have been described above with reference to the accompanying drawings, whilst the present disclosure is not limited to the above examples. It is apparent that a person skilled in the art of the present disclosure may find various alterations and modifications within the technical scope of the appended claims, and it should be understood that they will naturally come under the technical scope of the present disclosure.

Furthermore, the effects described in this specification are merely illustrative or exemplified effects, and are not limitative. That is, with or in the place of the above effects, the technology according to the present disclosure may achieve other effects that are clear to those skilled in the art from the description of this specification.

Note that the present disclosure may also be configured as below.

(1)

An information processing apparatus including:

an acquisition unit that acquires a message; and a control unit that controls projection of an object notifying a user of the message on the basis of an attribute of the message.

(2)

The information processing apparatus according to (1), in which the control unit controls the projection to an external projection surface.

(3)

The information processing apparatus according to (2), in which the control unit indicates a relative positional relationship between the user and a message transmission source apparatus for the message by the projection.

(4)

The information processing apparatus according to (3), in which the control unit indicates a direction from the user to the message transmission source apparatus by the projection.

(5)

The information processing apparatus according to (4), in which the control unit controls a position of the projection surface to which the object is projected.

(6)

The information processing apparatus according to (5), in which the projection surface has a recognition region that can be recognized by the user and the control unit controls a position of the recognition region to which the object is projected.

(7)

The information processing apparatus according to (3) or (4), in which the control unit indicates a separation distance between the user and the message transmission source apparatus by the projection.

(8)

The information processing apparatus according to any one of (1) to (7), in which the control unit further controls the projection on a basis of a situation or environment where the user is in, or a context including a state or action of the user.

(9)

The information processing apparatus according to (8), in which the control unit controls content of the object on the basis of an attribute of the message, content of the message, the context, or a possibility that the object is visually recognized by a different user.

(10)

An information processing method executed by a computer, including:
  acquiring a message; and
  controlling projection of an object notifying a user of the message on a basis of an attribute of the message.

REFERENCE SIGNS LIST

100 Information processing apparatus
110 Control unit
111 Projection surface determination unit
112 Projection position determination unit
113 Object determination unit
114 Projection execution unit
115 Recognition region output unit
120 Input unit
130 Sensor unit
140 Imaging unit
150 Output unit
160 Communication unit
170 Storage unit

The invention claimed is:

1. An information processing apparatus comprising:
  an acquisition unit that acquires a message from a message transmission source apparatus; and
  a control unit that controls projection of an object notifying a user of the message based on attributes of the message,
  wherein the object notifying the user of the message comprises an icon different from text of the message,
  wherein the attributes of the message used to control the projection of the object include a direction from the user to the message transmission source apparatus and a separation distance between the user and the message transmission source apparatus, and
  wherein the acquisition unit and the control unit are each implemented via at least one processor.

2. The information processing apparatus according to claim 1,
  wherein the control unit controls the projection to an external projection surface.

3. The information processing apparatus according to claim 2,
  wherein the control unit indicates a relative positional relationship between the user and the message transmission source apparatus for the message by the projection.

4. The information processing apparatus according to claim 3,
  wherein the control unit indicates the direction from the user to the message transmission source apparatus by the projection.

5. The information processing apparatus according to claim 4,
  wherein the control unit controls a position of the projection surface to which the object is projected.

6. The information processing apparatus according to claim 5,
  wherein the projection surface has a recognition region that can be recognized by the user, and
  the control unit controls a position of the recognition region to which the object is projected.

7. The information processing apparatus according to claim 3,
  wherein the control unit indicates the separation distance between the user and the message transmission source apparatus by the projection.

8. The information processing apparatus according to claim 1,
  wherein the control unit further controls the projection based on at least one of
    a situation or environment where the user is in, or
    a context including a state or action of the user.

9. The information processing apparatus according to claim 8,
  wherein the control unit controls content of the object based on the attributes of the message, content of the message, the context, or a possibility that the object is visually recognized by a different user.

10. The information processing apparatus according to claim 1,
  wherein the control unit controls the projection of the object to indicate the direction from the user to the message transmission source apparatus and the separation distance between the user and the message transmission source apparatus.

11. An information processing method executed by a computer, comprising:
  acquiring a message from a message transmission source apparatus; and
  controlling projection of an object notifying a user of the message based on attributes of the message,
  wherein the object notifying the user of the message comprises an icon different from text of the message, and
  wherein the attributes of the message used to control the projection of the object include a direction from the user to the message transmission source apparatus and a separation distance between the user and the message transmission source apparatus.

* * * * *